US010825480B2

(12) United States Patent
Marco et al.

(10) Patent No.: US 10,825,480 B2
(45) Date of Patent: Nov. 3, 2020

(54) AUTOMATIC PROCESSING OF DOUBLE-SYSTEM RECORDING

(71) Applicant: Apple Inc., Cupertino, CA (US)

(72) Inventors: Todd P. Marco, San Jose, CA (US); Girault W. Jones, Los Gatos, CA (US); Kavitha Srinivasan, Saratoga, CA (US); Aram M. Lindahl, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 192 days.

(21) Appl. No.: 15/610,431

(22) Filed: May 31, 2017

(65) Prior Publication Data

US 2018/0350405 A1    Dec. 6, 2018

(51) Int. Cl.
| | |
|---|---|
| *G11B 27/031* | (2006.01) |
| *H04N 9/82* | (2006.01) |
| *H04N 5/77* | (2006.01) |
| *G10L 25/57* | (2013.01) |
| *G11B 27/19* | (2006.01) |
| *H04R 3/00* | (2006.01) |
| *G06K 9/00* | (2006.01) |

(52) U.S. Cl.
CPC ............ *G11B 27/031* (2013.01); *G10L 25/57* (2013.01); *G11B 27/19* (2013.01); *H04N 5/77* (2013.01); *H04N 5/772* (2013.01); *H04N 9/8205* (2013.01); *H04N 9/8211* (2013.01); *H04R 3/005* (2013.01); *G06K 9/00744* (2013.01); *H04R 2420/07* (2013.01); *H04R 2430/20* (2013.01); *H04R 2499/11* (2013.01); *H04S 2400/15* (2013.01)

(58) Field of Classification Search
USPC .................................. 386/223–224, 239–248
See application file for complete search history.

(56) References Cited

U.S. PATENT DOCUMENTS

| | | | |
|---|---|---|---|
| 6,717,991 B1 * | 4/2004 | Gustafsson | ............ H04R 3/005 375/285 |
| 8,264,934 B2 | 9/2012 | Waites | |
| 8,649,487 B2 * | 2/2014 | Ai | ....................... H04L 65/4038 348/14.08 |

(Continued)

FOREIGN PATENT DOCUMENTS

EP            2567498          3/2016

*Primary Examiner* — Hung Q Dang
(74) *Attorney, Agent, or Firm* — Womble Bond Dickinson (US) LLP

(57) ABSTRACT

A method for automatically producing a video and audio mix at a first portable electronic device. The method receives a request to capture video and audio, performs a network discovery process to find a second portable electronic device, and sends a message to the second device indicating when to start recording audio for a double system recording session. The method initiates the recording session, such that both devices record concurrently. In response to the first device stopping the recording of audio and sound, signaling the second device to stop recording for the identified recording session. In response to the first device receiving a first audio track from the second device that contains an audio signal recorded during the recording session, automatically generating a mix of video and audio, such that one of the audio signals from the first and second tracks is ducked relative to the other.

19 Claims, 7 Drawing Sheets

(56) References Cited

U.S. PATENT DOCUMENTS

| | | | |
|---|---|---|---|
| 8,989,552 B2 | 3/2015 | Slotte | |
| 9,247,191 B2* | 1/2016 | Saari | H04N 5/77 |
| 2005/0080849 A1* | 4/2005 | Wee | H04L 12/1827 |
| | | | 709/204 |
| 2008/0201138 A1* | 8/2008 | Visser | G10L 21/0208 |
| | | | 704/227 |
| 2010/0008641 A1* | 1/2010 | Murabayashi | G10H 1/368 |
| | | | 386/200 |
| 2013/0108057 A1* | 5/2013 | Yuyama | H04S 3/002 |
| | | | 381/17 |
| 2013/0188932 A1* | 7/2013 | Hartley | H04N 9/87 |
| | | | 386/282 |
| 2013/0250035 A1* | 9/2013 | Murali | H04M 3/56 |
| | | | 348/14.09 |
| 2014/0049636 A1* | 2/2014 | O'Donnell | G08C 17/02 |
| | | | 348/143 |
| 2014/0152777 A1* | 6/2014 | Galor | H04N 5/2254 |
| | | | 348/47 |
| 2016/0005435 A1* | 1/2016 | Campbell | H04N 9/806 |
| | | | 386/240 |
| 2016/0064002 A1* | 3/2016 | Kim | G10L 15/22 |
| | | | 704/246 |
| 2017/0352349 A1* | 12/2017 | Vrazic | G01S 3/801 |

\* cited by examiner

AUTOMATIC PROCESSING OF DOUBLE-SYSTEM RECORDING

FIELD

An embodiment of the invention relates to a double-system recording technique for automatically and intelligently generating a mix of audio and video captured by at least two portable consumer electronic devices, respectively. Other embodiments are also described.

BACKGROUND

Double-system recording is a professional cinematography technique whereby audio for a scene is recorded by a separate machine than video for the scene, and later combined for a final product (e.g., a mix). This technique allows a user (e.g., a director) to capture sound from ideal microphone locations, which are decoupled from the camera. For example, during an interview, an interviewer and an interviewee can wear individual lavalier microphones (e.g., lapel microphones) in order to better capture a separate audio channel for each person. After the interview and during post-production, the director can use the audio signals from either audio channel to produce a mix with the best audio quality. For instance, the director may choose an audio signal captured by the interviewer's lapel microphone while the interviewer is speaking, since sound associated with this audio signal may be clearer (e.g., contain less noise) than an audio signal captured by the interviewee's lapel microphone. In addition, a double-system recording system allows actors wearing the individual microphones freedom of movement; otherwise, the actors would be required to stay within a certain range of a stationary microphone (e.g., the microphone within a video camera).

SUMMARY

A conventional double-system recording has drawbacks. For example, during a take, the audio channels being captured by individual microphones may not be synchronized to each other or to the video. This may be due to the fact that the microphones were set to record (e.g., turned on) at different times before the take. Mixing the video captured by the camera with unsynchronized audio channels may have adverse results (e.g., a lip-sync error in which a person speaking doesn't match up with the sound of them speaking). Traditionally, synchronization is achieved by using a clapperboard at the beginning of every take. The clapboard creates an audible impulse that a director uses to manually align the captured audio channels with a corresponding video frame (showing the clapboards use at the time the impulse was created) during post-production.

An embodiment of the invention is a method for automatically and intelligently producing a video and audio mix by using a double-system recording in which at least two different portable consumer electronic devices (e.g., smartphones, smartwatches) capture video and audio of the scene. Note that the term "double system recording" as used here refers to two or more devices that can capture sound, or both sound and video. Specifically, the system may include a first portable electronic device (e.g., "local" or "master" device) and a second portable electronic device (e.g., "remote audio capture" or "slave" or "remote" device). The first device receives a request to capture video and audio for a double system recording session, by a user of the first device. Such a request may be received through a selection of a user interface (UI) item (e.g., a double system recording button on a touch-sensitive screen of the device). The first device may perform a network discovery process through a wireless computer network, which finds the second device that is capable of capturing audio. In one embodiment, the network discovery process is triggered in response to the request. Once the second device is found, a wireless connection may be established between the first device and the second device. The first device sends to the second device, through the wireless connection, a message indicating a future time when the second device is to start its audio capture (recording sound) for a recording session, which is also the time when the first device will start its video and audio capture. This message (or previously exchanged synchronization messages between the first and second devices) may ensure that both the first and second devices have a synchronized start time in which both devices start recording simultaneously. The recording session then starts at the specified start time, such that both the first and second devices begin recording concurrently. In response to the first device stopping the recording of its video and sound for the recording session (e.g., through the user of the device selecting a "Stop" button), the first device signals the second device to stop its recording for the recording session. The second device does so, and also interprets the signal to mean that it send to the first device a first audio track, having an audio signal of the sound recorded by the second device (also referred to here as the first audio signal). The first device has stored in it a second audio track that has an audio signal of the sound recorded by the first device (referred to here as the second audio signal), and a video track that has video recorded by the first device. In response to receiving the first audio track from the second device, the first device automatically generates a video and audio mix in which portions of the audio signal from first audio track, the audio signal from the second audio track, and video from the video track, have been combined, such that in the mix one of the audio signals from the first and second tracks is ducked relative to the other audio signal in the mix during certain, chosen time intervals.

In one embodiment, the mix is automatically generated, including the selection of the chosen time intervals during which the second audio signal is ducked, based on an analysis of the video in the video track. For example, a video segment (e.g., as few as five frames) of video from the video track is analyzed to identify an image object therein that suggests the audio signal within either of the first or second audio tracks should be emphasized more than the other, in the mix. The identified image object may include a facial expression of a person within the video segment (e.g., mouth moving and blinking), an object (e.g., a car or a dog) within the video segment, or a particular scene (e.g., sunset or beach) within the video segment. In addition to identifying the image object, the video may be analyzed to identify movement of the image object within the video segment. The identified movement of the image object may also be used to determine which audio signal should be emphasized. In response to identifying an image object or the movement of the image object, ducking values are applied to the audio signal from the second audio track such that the audio signal from the second audio track is deemphasized (ducked), relative to the audio signal from the first audio track (and which is experienced by a listener during playback of the mix.) The first device then combines the video from the video track, the audio signal from the first audio track, and the audio signal from the second audio track with the applied ducking values, into the mix.

In one embodiment, the mix is automatically generated based on an analysis of the audio signals from the first and second audio tracks. For example, the audio signal from the first audio track may be compared with the audio signal from the second audio track in order to identify an audio characteristic therein that indicates whether one of the audio signals from the first and second audio tracks should be emphasized over (or more predominant than) the other, in the mix. The mix may be generated by applying ducking values, based on the identified audio characteristic, to one of the audio signals from the first and second audio tracks (e.g., the audio signal from the second audio track) that is to be deemphasized, with respect to the other one of the audio signals from the first and second audio tracks (e.g., the audio signal from the first audio track), which may be apparent to a listener during playback of the mix. For instance, ducking values may be applied to the second audio signal when an audio characteristic being a signal-to-noise ratio of the second audio signal is lower than that of the first audio signal. In one embodiment, ducking values may be applied when an audio characteristic is assigned a higher probability of detected speech in the first audio signal than in the second audio signal. A comparison of the first and second audio signals may also indicate whether other audio processing operations, such as spectral shape modification (e.g., equalization), dynamic range compression, and/or noise suppression, should be performed to one of the audio signals in the mix in order to improve audio quality of the mix as a whole.

In one embodiment, additional audio may be added to the mix, based on an analysis of the audio signals from the first and second audio tracks. For instance, based on a comparison between the first and second audio signals, a prerecorded audio track (e.g., a musical composition) may be added to the mix at an appropriately low volume or level so as to be in the background of the mix.

In one embodiment, one or more of the audio signals from audio tracks recorded by several portable electronic devices may be ducked, based on estimated distance information between the devices. For example, consider the case of two portable devices (e.g., slave devices) that have recorded two audio tracks, respectively, and another portable device (e.g., the master device) that has recorded an audio track and video track. As the devices record video and audio for a scene, estimated distances between the slave devices and the master device may be used to determine if an audio signal recorded by a slave device should be ducked. For instance, as a master device is recording a particular scene (e.g., a groom waiting at an altar, during a wedding), if it is determined that one of the slave devices (e.g., a slave device carried by the bride and being used to capture audio) is far away from the master device (e.g., outside the church), then audio signals from that slave device may be ducked, since those audio signals are assumed to not be a part of the particular scene being recorded by the master device. The distances between the slave devices and the master device can be estimated, by detecting and analyzing the relative timing of a single, distinct audio event (e.g., a "clap" or in the case of the previous example, a "chime" from a church bell) in each of the three audio tracks recorded by the devices. The estimated distance information for each of the slave devices may then be compared to a distance threshold. When one of the slave devices has estimated distance information that exceeds the distance threshold (e.g., is far away from the master device) an audio signal from the slave device's audio track may be ducked.

In one embodiment, several devices (e.g., the local device and at least one remote device), rather than just the local device, may capture video, and that two or more video signals may be intelligently mixed into a single video track. Thus, there may be a first video signal captured by the local device, and at least one other video signal, e.g., a second video signal captured by the second device (for the same recording session). Similar to what is done for the first audio track, the second device may send its second video signal to the first device, upon receiving the stop recording signal from the first device. The first device then generates a mix using portions of the first and second video signals, as well as the audio signals from the first and second audio tracks. Specifically, to generate the mix, the first device may analyze the audio signals from both the first and second audio tracks to identify audio characteristics therein that suggest for example that a portion of the second video signal should replace that of the first video signal, in the mix. In doing so, the first device may apply a transition effect (e.g., a cut, a wipe, or a fade out effect) to the first video signal such that there is a transition (or a segue) from the first video signal to the second video signal. Having applied the effect, the mix is generated by combining the first video signal with the applied transition effect, the second video signal, and the first and second audio signals.

The generation of the mix may involve analyzing one (e.g., the first) video signal or several (e.g., the first and second) video signals instead of (or in conjunction with) one (e.g., the first) audio signal or several (e.g., the first and second) audio signals. For example, an analysis of the video signals alone may identify an image object therein that suggests one of the video signals is to be displayed in lieu of (or over) the other. A comparison of image objects from the first and second video signals may indicate a priority (or predominance). For instance, an identified image object of a person speaking (e.g., mouth moving) in the second video signal may be more preferable (or have a higher priority) than an identified image object (e.g., a car) in the first video signal. Since the second video signal includes an image object of higher priority, a transition effect may be applied to the first video signal to segue from an end of a scene in the first video signal to a start of a scene in the second video signal. In one embodiment, rather than comparing priorities of image objects, the transition effect may be applied to the video signal that is completely devoid of a particular image object. For example, since the first video signal does not include an image object of a person talking, the transition effect may be applied. In addition, an analysis of both video and audio may suggest one of the video signals is displayed (or emphasized) over the other video signal, as well as, one of the audio signals is emphasized over the other audio signal. Continuing with the previous example, a comparison of the identified image object with audio characteristics identified from the first and second audio signals may indicate which of the audio and video signals should be emphasized. For instance, the second audio and video signals may be emphasized, when an audio characteristic that indicates speech (or is assigned a greater probability of speech than other audio signal(s)) is compared with the image object of a person speaking. Once the second video and audio signals are deemed to be emphasized, the first device may apply ducking values to the first audio signal and a transition effect to the first video signal, in order to emphasize the second audio and video signals during playback.

In one embodiment, some of the constituent operations for generating the mix could be performed remotely by a server, particularly those that might be computationally intensive, such as the video and audio signal analysis. For example, the first device could transmit the video track (with a video signal) that has video recorded by the first device and audio tracks with audio signals recorded by the first and second devices to the server and request the server to perform an analysis on the video and audio tracks. Then, the first device would receive the results of such analysis, which would then be used to decide how to duck one of the audio signals, for example.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness and reducing the total number of figures, a given figure may be used to illustrate the features of more than one embodiment of the invention, and not all elements in the figure may be required for a given embodiment.

DETAILED DESCRIPTION

Several embodiments of the invention with reference to the appended drawings are now explained. Whenever the shapes, relative positions and other aspects of the parts described in the embodiments are not explicitly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
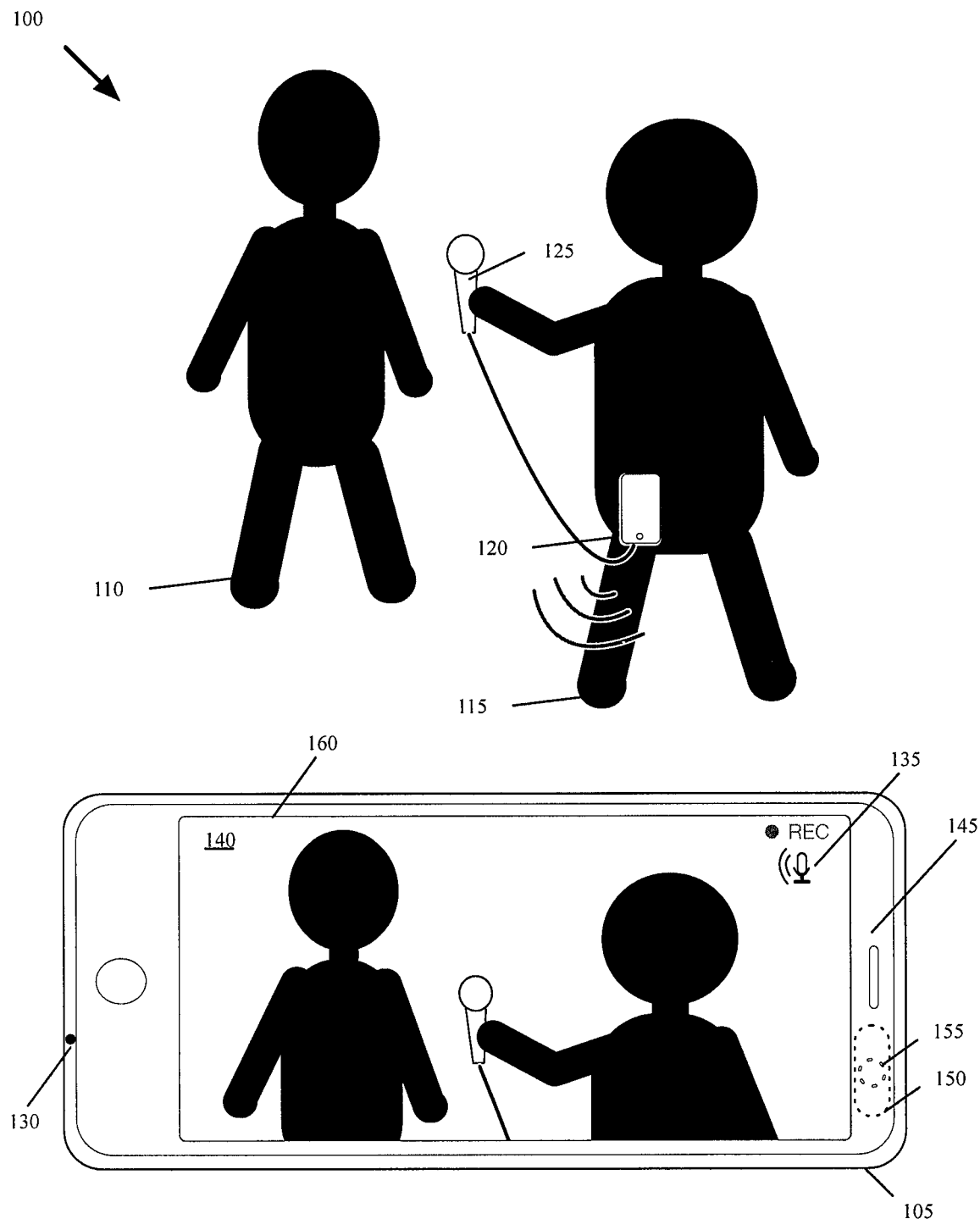
FIG. 1 depicts a recording session being captured with an example double-system recording, in which a local device captures video and audio and a remote device captures audio only.

FIG. 1 depicts an audio-visual recording session 100 of an interview between an interviewer 115 and an interviewee 110. The recording session 100 is recorded using a "double-system" recording scheme in which device 105 is recording (e.g., capturing) video and audio (e.g., sound) of the interview while at the same time device 120 is recording different audio of the same interview. "Double-system" refers to the capability of having several devices (e.g., 120 and 105) record video, audio, or a combination of video and audio for a given recording session. The devices 120 and 105 may be any computing devices that are capable of recording video and/or audio. For example, each device may be a personal video recorder (camcorder), a laptop computer, a tablet computer, a smartphone, or a standalone audio recorder. In this particular case, however, the devices 105 and 120 are both smartphones.

To record the session 100, device 105 first initiates a communication link (e.g., a wireless connection) with device 120 over a peer-to-peer (P2P) wireless network, in a "master-slave" configuration. For instance, in this example, device 105 is the "master" (or "local" or "first portable electronic") device and device 120 is the "slave" (or "remote audio capture" or "remote" or "second portable electronic") device. Once the communication link is established, remote audio capture device 120 synchronizes (e.g., its internal clock that is used for capturing or editing a video or audio signal) with local device 105, such that i) audio of the interview that is being recorded by the slave device 120 is time-aligned with ii) video and audio of the interview that is being recorded by the local device 105; in other words, i) and ii) are "inherently" time-aligned as they are being captured. More about establishing the communication link and synchronizing the devices is described in FIG. 3.

Once synchronized, the local device 105 initiates the recording session 100, upon receiving a request by the user of the device (e.g., a user-selection of a UI item displayed on a touch-sensitive display screen of the local device). To initialize, the local device 105 may send a message to the remote audio capture device 120 that informs the remote device when to start recording audio. For instance, the message may indicate a particular amount of time (e.g., a half a second) after which the remote device is supposed to record the audio. As both the local and remote devices are synchronized, when the time comes to start recording, both the local and remote devices will start recording video and/or audio at the same time, such that audio being captured by the remote device 120 is time-aligned with the video and audio being captured by the local device 105.

The local device 105 records video by using a camera 155 positioned on a backside 150 of device 105 to capture the video to produce a corresponding video signal, and records audio using a microphone 130 that senses sound and produces a corresponding audio signal. In one embodiment, the local device 105 may include several microphones, and may treat the microphones as a microphone array that is feeding a beamforming process for capturing audio through beamforming. A user (not shown) of local device 105 holds the device horizontally or in a landscape orientation as shown, with a front side 145 of the device 105 pointed towards the user and the backside 150 pointed towards the interviewer 115 and the interviewee 110. The local device 105 presents a preview 140 of the video on a touch-sensitive display screen 160 as it is being captured by the camera 155 of local device 105. This preview 140 allows the user of the local device 105 to know what the video looks like as it is currently being captured by the camera 155. The preview 140 also allows the user to see, in real time, any adjustments the user is making to the camera 155 and device 105 (e.g., zooming and panning) in order to optimize the video to the user's liking as it is being recorded. The display screen 160 also includes an icon 135, which indicates that a remote audio capture device (e.g., 120) is linked with the local device 105, and is recording different audio of the interview during the recording session 100.

While the local device 105 records video and audio, as described previously, remote audio capture device 120 is being used to record different audio than the local device 105. In this example, a separate, handheld microphone 125, which is being held by the interviewer 115, is being used to sense sound of the interview and convert the sound into an audio signal that is being transmitted (via a wire) to the remote audio capture device 120. This separate, handheld microphone 125 and its cable are considered in this example to be part of the remote device 120. An alternative to such a wired microphone is to use the microphone of a wireless BLUETOOTH headset that is paired with the remote device 120 (which could be worn by the interviewee 110.) Another alternative is to use a built-in microphone that is embedded within the housing of the remote audio capture device 120 (e.g., similar to how the microphone 130 is embedded in the housing of the local device 105.) In all instances, the live-captured audio signal is being stored as an audio track in the remote device 120. The audio recorded by the remote audio capture device 120 is different then the audio recorded by the local device because the microphone 125 of the local device 105 is sensing speech of the interviewee 110 from a different location than the microphone 125 that is attached to the remote audio capture device 120, and it closer to the interviewee 110. Since the local device 105 is farther from the interviewee 110, the audio signal produced by its microphone 130 may contain a lower signal-to-noise ratio than an audio signal produced by microphone 125, as well as a different version of the ambient or background sound.

Figure 2:
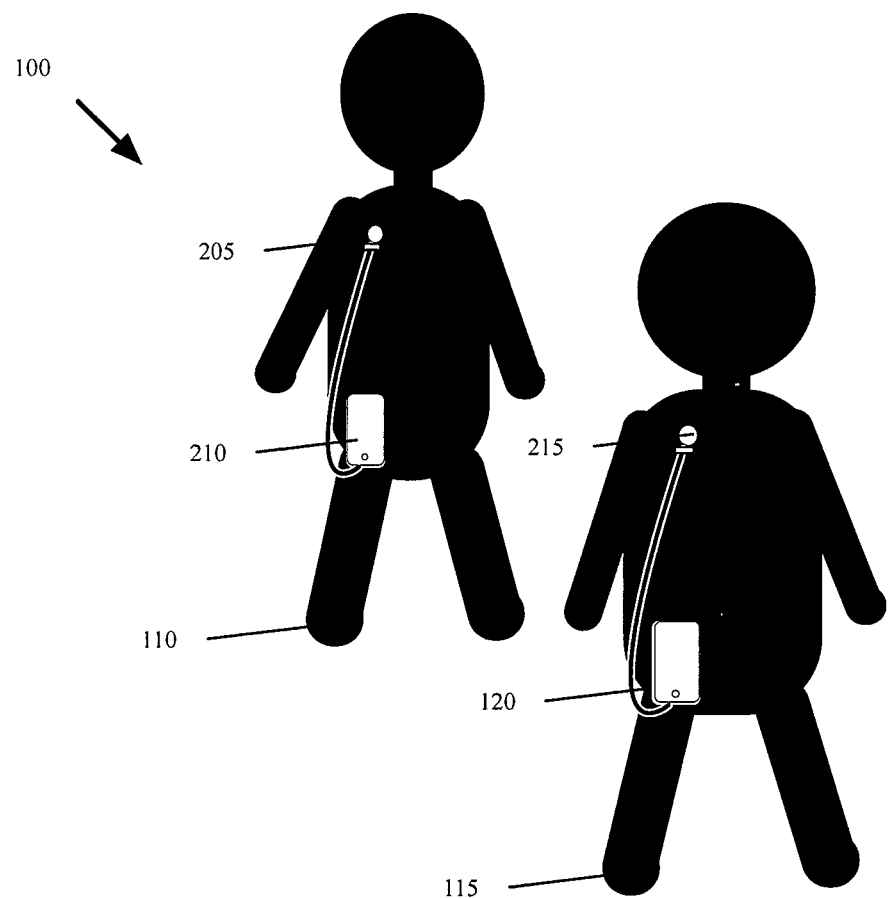
FIG. 2 depicts the recording session being captured with another example double-system recording, in which a local device captures video and audio and several remote devices capture audio only.
Figure 2:
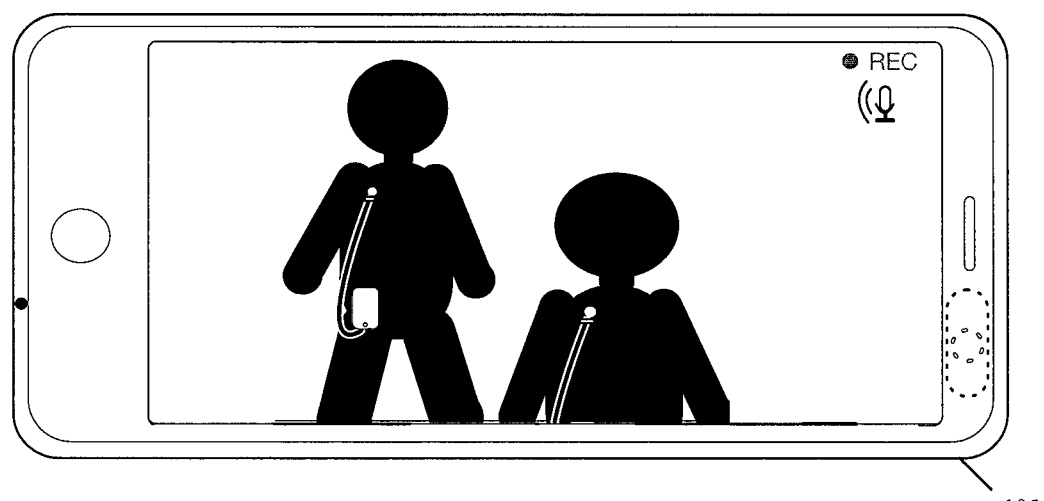

In one embodiment, rather than recording audio through the use of a handheld microphone (e.g., 125, as depicted in FIG. 1), audio may be recorded through the use of lapel microphones. FIG. 2 depicts such a scenario. This figure depicts the same audio-visual recording session 100, as in FIG. 1, but instead of using a single remote audio capture device 120 to record audio from the interviewee 110 (and potentially the interviewer 115), both the interviewee and interviewer have their own lapel microphones wired connected to individual remote audio capture devices. Specifically, interviewee 110 is wearing a lapel microphone 205 that is sensing sound (e.g., speech) of the interviewee and converting the sound into an audio signal that is being transmitted (via a wire) to the remote audio capture device 210, which is being carried by the interviewee 110 (e.g., in their pocket). Similarly, the interviewer is also wearing a lapel microphone 215 that is sensing sound (e.g., speech) of the interviewer and converting the sound into an audio signal that is being transmitted to the remote audio capture device 120.

Once the interview has concluded, the user of local device 105 will terminate the video recording session 100 (e.g., by hitting a "Stop" button). The local device 105 will, in response, inform the remote audio capture device 120 that the recording session 100 has been terminated in order to retrieve an audio signal (or an audio track containing the audio signal) captured by the remote audio capture device 120 during the recording session 100. In one embodiment, the remote audio capture device 120 may either send the audio track directly to the local device 105 (via the communications link) after the session 100 is complete, or the remote device 120 may transmit the audio track at a later time (e.g., when it is determined that both devices are within a certain range of each other). In one embodiment, rather than sending the audio track directly to the local device 105, the remote audio capture device 120 may transmit the audio track to a cloud storage (e.g., ICLOUD) for later retrieval by the local device 105. During the video recording session, the local device 105 will produce a video signal captured by the camera 155 and an audio signal captured by microphone 130. In one embodiment, the local device 105 may generate a video track containing the recorded video signal captured by the camera 155 and generate an audio track containing the audio signal captured by microphone 130. In one embodiment, rather than generating the video and audio tracks at the end of the recording session 100, these tracks may be generated at the beginning of the recording session 100, with captured video and/or audio being added to their respective tracks while they are being recorded. In one embodiment, when in possession of the video track and audio tracks, the local device 105 may synchronize the video track and the audio tracks recorded during the session 100 based on both devices' internal clocks that were synchronized during initiation of the session 100. Local device 105 may also automatically intelligently mix the video track and audio tracks based on data contained within video segments from the video track and audio signals from the audio tracks that are synchronized with the video segments (e.g., through the use of image objects, moving elements, and audio characteristics) into a mix that is stored within a single multimedia file and/or multimedia container package. More about syncing and intelligently mixing the video track and audio tracks is described in FIGS. 4-6. As a result, a user may be capable of sharing and distributing the single multimedia file as a final product with minimal to no manual post-processing that would otherwise be required to synchronize and mix the video track and audio tracks together. Furthermore, in one embodiment, the single multimedia file (or multimedia container package) may also contain the individual (unprocessed) tracks (e.g., video track(s) and/or audio track(s)) and elements used to process the individual tracks (e.g., ducking values), such that manual adjustments to the intelligent mix is permitted, and the individual unprocessed tracks may also be made available for optional manual post processing.

Figure 3:
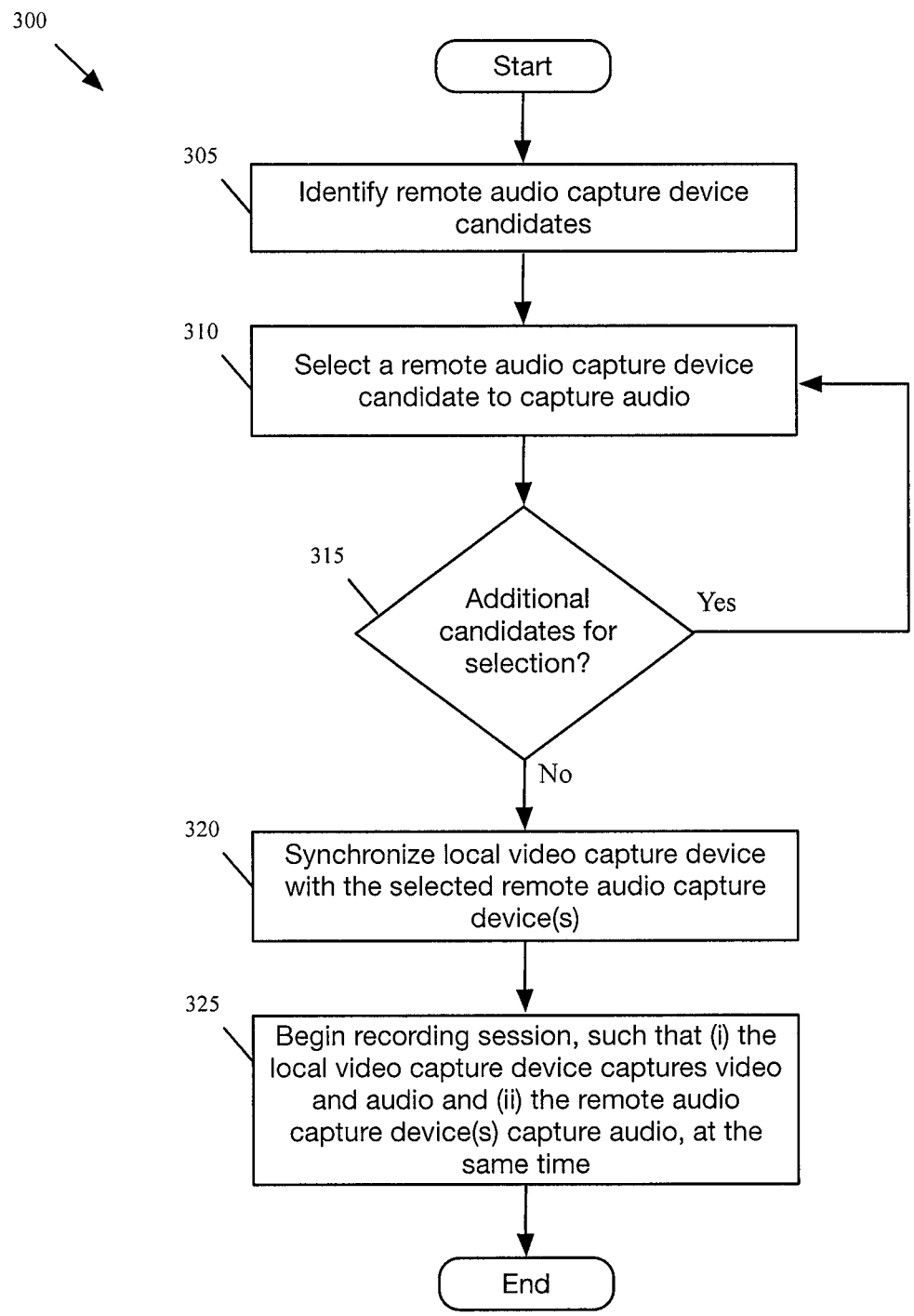
FIG. 3 shows a flowchart of one embodiment of a process to establish a recording session.

FIG. 3 is a flowchart of one embodiment of a process 300 in which a recording session (e.g., 100) is established between a local device and at least one remote audio capture device. The process 300 will be described by reference to FIG. 1. For example, process 300 may be performed by local device 105, which is the "master" or "local" device, as described in FIG. 1. It should be understood that since the local device 105 and the remote audio capture device 120 are similar devices (e.g., smartphones), either device may be capable of acting as the local (or master) device or acting as the remote audio capture (or slave) device. In FIG. 3, process 300 begins by identifying (at block 305) remote audio capture device candidates. This operation may be in response to (e.g., triggered by) the user of the local device 105 initiating a video capture application for recording video and audio during a recording session 100. In one embodiment, this operation may be in response to (e.g., triggered by) the local device 105 receiving a request from the user (e.g., through selection of a user interface (UI) item on the touch-sensitive display screen 160) to capture a recording session through the use of double-system recording. To identify remote audio capture device candidates, the local device 105 may perform a network discovery protocol process over a wireless network (e.g., Bluetooth protocol or a wireless local area network (WLAN)) that identifies each of the device candidates by their respective addresses (e.g., Internet Protocol (IP) addresses or similar). In one embodiment, the local device 105 may emit a signal beacon to discover the remote audio capture device candidates within a particular range of the local device (or within a particular network in which the local device is a part of) and to acquire their addresses. Once the addresses are identified, the local device 105 may initiate a communication link (e.g., via a P2P wireless network) with each of the device candidates using the wireless network. In one embodiment, with an established communication link, the device candidates may communicate (e.g., using IEEE 802.11x standards) with the local device by transmitting information describing their capabilities (e.g., ability to act as a remote audio capture device). In one embodiment, the communication link may already be established (e.g., the local device and a candidate device may be paired), prior to performing the network discovery protocol process. If the transmitted information indicates that the device candidates are incapable of acting as a remote audio capture device (e.g., do not have a means to capture audio), the local device may discard their identified addresses and terminate their corresponding communication links, since these device candidates cannot participate in the recording session.

The process 300 selects (at block 310) a remote audio capture device candidate to capture audio. This selection may be in response to a user-selection of the remote audio capture device candidate through the video capture application. For example, each of the device candidates in which the local device 105 has established a communication link may be represented in the video capture application as a UI item displayed on the display screen 140 of the local device 105. Each device candidate UI item may be distinguishable (e.g., via a device name, a name of the user of the device, or an avatar of the user of the device) from the other candidate devices. The user of the local device may then select an appropriate candidate device through a selection (e.g., tap gesture) of the UI item displayed on the touch-sensitive display screen 160. In another embodiment, the local device 105 may automatically (e.g., without user intervention) select a candidate device based on a particular set of criteria (e.g., whether the candidate device is within a particular range from the local device 105 or based on whether the candidate device meets certain system requirements, such as having sufficient battery life).

Upon selection of a remote audio capture device candidate, the local device 105 may transmit a message (via the communication link) to the device candidate, containing a request to capture audio. The request may be displayed on a display screen of the device candidate (e.g., a popup may be displayed indicating "Local Device Would Like To Use Your Microphone"), for the user of the device candidate to either accept or deny. Once the request is accepted, the device candidate would transmit a message back to the local device, indicating that the device candidate is willing to participate in the recording session. If the user of the device candidate denies the request, however, the device candidate would transmit a message indicating its unwillingness to participate. Once the local device receives a denial from the device candidate, the local device may terminate the communication link between the local device and the device candidate. In one embodiment, the device candidate may automatically (e.g., without user intervention) accept, or deny the request, based on whether system conditions have changed since the establishment of the communication link (e.g., a reduction in battery life).

The process 300 determines (at block 315) whether there are additional candidates for selection. The video capture application may display UI items corresponding to these additional candidate devices differently (e.g., a different highlighting) than UI items corresponding to previously selected and participating remote audio capture devices. If additional candidate devices are to be selected, the process 300 returns to block 310 to select one of the additional candidates. Otherwise, if there are no additional candidates for selection, the process 300 proceeds to synchronize (at block 320) an internal clock of the local device with each of the internal clocks of the selected remote audio capture devices. In one embodiment, the process 300 proceeds to synchronize when the user of the local device indicates (e.g., through selection of a "Done" button displayed within the video capture application) that no additional remote audio capture devices are required for the recording session. For instance, rather than proceeding to block 320, from block 315 when no additional candidates are for selection, the user may select the "Done" button, indicating that all required remote audio capture devices have been selected, regardless of whether there are additional device candidates for selection.

To synchronize the local device with the selected remote audio capture devices, the local device may send and receive from each of the selected remote audio capture devices synchronization messages. These messages may synchronize the local devices with the selected remote audio capture devices by accounting for the amount of time that it takes for the remote devices to receive messages from the local device. To illustrate such synchronization, reference will be made to FIG. 1. For instance, to synchronize an internal clock of remote device 120 with an internal clock of the local device 105, local device 105 may transmit a first message containing a time stamp ("T") to the remote device 120. Once the remote device 120 receives the message, it will then transmit a second message back to the local device 105, indicating receipt of the first message. When the local device 105 receives the second message, it will identify that the time stamp contained within the second message is now $T+2\Delta$, where $\Delta$ is the amount of time it takes for the message to be transmitted over the air (e.g., via the P2P wireless network) to (or from) the remote device 120. The local device 105 may now synchronize its internal clock with the internal clock of the remote device 120 based on $\Delta$. With both devices' internal clocks synchronized, operations performed at the local device may occur simultaneously (or almost simultaneously) with operations performed at the remote device. For example, if a user of the local device wishes to start recording video and audio at the local device at a time $\tau$ (e.g., in two seconds), and wishes for the remote device 120 to record audio at the same time, another message may be sent to the remote device 120 requesting the remote device 120 to begin recording audio at time $\tau-\Delta$ (e.g., to start recording in two seconds, minus the amount of time it takes for the message to reach the remote device). This will ensure that both devices begin recording simultaneously (or almost simultaneously). In one embodiment, in order to maintain a synchronized internal clock between the local device 105 and the remote device 120, messages with time stamps may be continuously transmitted between the devices while the communication link is open between the two devices, such that the internal clocks maintain synchronization (e.g., by updating $\Delta$). This is just one example of synchronizing devices. In one embodiment, any existing method to synchronize internal clocks between the local device 105 and remote device 120 may be used. For example, the internal clock of the remote device 120 may be synchronized with the internal clock of the local device 105 using IEEE 1588 precision time protocol (PTP) standard.

With the local device and the remote devices synchronized, the process initiates (at block 325) the recording session, such that the local device begins to record video and audio and the remote device(s) begin to record audio at the same time (e.g., with all devices within the recording session having an aligned start time) and continue to record video and audio simultaneously (e.g., keeping all recorded video and audio time-aligned). To begin the recording session, the local device may receive an indication (e.g., a request) from the user of the device. For example, in order to start the recording session, the user may select a UI item within the video capture application (through a tap gesture on the touch sensitive display screen of the local device), such as a "Start" button, a "Shutter" button, or alike. In one embodiment, the button to begin the recording session may be selectable, once the local and remote devices are synchronized, in order to avoid having the user start the session prior to completion of synchronization between the devices. Once selected, the local device may transmit a message to the remote audio capturing devices, indicating a time (e.g., $\tau-\Delta$, as previously described) in which each of the audio capturing devices is to start recording audio. Once the message is received, the remote audio capturing devices and the video capture device will start recording once that time takes place. In one embodiment, rather than receiving a physical indication (e.g., a tap gesture) from the user to start the recording session, the user of the local device may indicate a start of the recording session through hands free technology. For instance, through use of voice recognition, the local device may receive and recognize a vocal command (e.g., "Start Recording") from the user of the local device to start the recording session. The local device may compare the recognized vocal command with previously stored vocal commands in order to determine whether the user requested to start the session. After the recording session begins, the process 300 ends.

In one embodiment, the way in which the remote audio capture devices record audio may be chosen by the user of the local device. For instance, once the communication link between the local device and remote audio capture device candidates is established, the information transmitted by the remote audio capture device may indicate whether an external microphone (e.g., microphone 125 in FIG. 1 or label microphone 215 in FIG. 2) is attached to the remote audio capture device candidate. As the user of the local device selects the remote audio capture device candidate (e.g., in block 310, from FIG. 3) to participate in the recording session, the user may be prompted to choose either the attached external microphone or internal microphones for capturing the audio. In one embodiment, the user of the remote audio capture device candidate may make the selection of which microphone may be used to capture audio during the recording session. While, in another embodiment, the decision may be automatic (e.g., based on whether an external microphone is connected, or based on signal-to-noise ratio of audio signals produced by microphones (e.g., internal and external) that are sensing sound).

Figure 4:
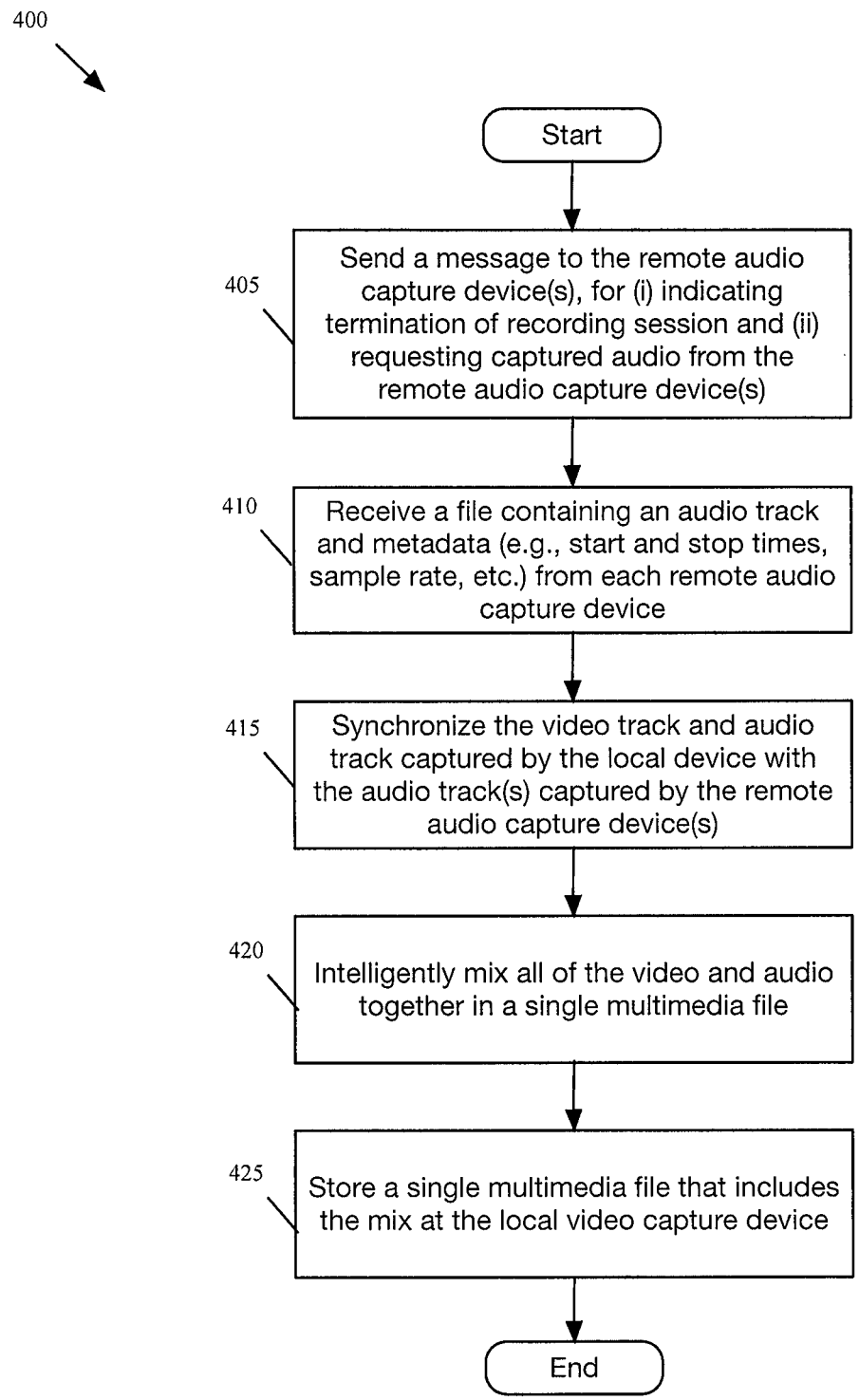
FIG. 4 shows a flowchart of one embodiment of a process to generate a mix of video and audio captured with double-system recording.

FIG. 4 is a flow chart of one embodiment of a process 400 to generate a mix of video and audio captured with a local device and remote audio capture device(s). In one embodiment, the process of 400 is performed by local device 105, as described above in FIG. 1, when a user of the local device 105 wishes to end the recording session 100 with remote device 120. However, process 400 may be performed by a local device with respect to several, rather than one, remote audio capture devices that are each capturing separate audio.

As shown in FIG. 4, process 400 begins by sending (at block 405) a message to the remote audio capture device(s), for indicating that the recording session is to be terminated and for requesting the remote audio capture device(s) to send their recorded audio signals in audio tracks to the local device. To end the recording session, similar to starting the recording session (as described previously in FIG. 3), the local device may receive an indication from the user of the local device. For example, the user may select a UI item within the video capture application (through a tap gesture on the touch sensitive display screen of the local device), such as a "Stop" button, a "Shutter" button, or alike. Hence, the beginning of the process 400 (at block 405) may be in response to the user of the local device selecting the UI item. In one embodiment, the user may end the recording session through voice recognition. For instance, the local device may receive and recognize a vocal termination command (e.g., "Stop Recording") from the user of the local device to stop the recording session. Processing of the vocal termination command may include truncating the end of the recording, such that the video retroactively ends just (e.g., a half a second) before the vocal command began to be received by the local device.

The process 400 receives (at block 410), from each remote audio capture device participating in the recording session, a file containing an audio track with an audio signal captured by the remote audio capture device and containing data relating to the recording session. In particular, the data may include time stamps indicating a start time in which the remote audio capture device started recording audio, and a stop time in which the remote audio capture device ceased recording audio. Along with the start and stop times, the data may also include time stamps throughout the entire length of the audio track (e.g., every five seconds). In one embodiment, the data may also include a sample rate in which the remote audio capture device recorded the audio (e.g., 44.1 kHz). In one embodiment, the data may include any information relating to the recording session (e.g., location information and date in which the recording session took place). In one embodiment, the time stamps contained within the file may be any standard timecode that is used to synchronize video with audio. For example, the time stamps may be a Society of Motion Picture and Television Engineers (SMPTE) timecode that contains binary coded decimal (e.g., hour:minute:second:frame) identification. The file, which is received by the local device, may be any file that is capable of containing an audio track and associated data (e.g., timestamp information). For example, the file may be a Broadcast Wave Format (BWF) audio file that is capable of containing the audio track and embedding data in a header of the file. In another embodiment, the file may be any type of video format file (e.g., MP4).

In one embodiment, the local device may receive the file at different times and from different sources. For instance, the local device may receive the file directly from each remote audio capture device (e.g., via a communication link), following each remote audio capture device's receipt of the message indicating termination of the recording session. In one embodiment, a remote audio capture device may suspend transmission based on several factors. For example, the remote audio capture device may wait to transmit the file until a threshold signal strength of the communication link between the remote audio capture device and the local device is met, such that there is a minimum amount of packet loss during transmission. The remote audio capture device may also suspend transmission until another remote audio capture device transmitting its file is finished, in order to avoid overworking the local device as several remote audio capture devices are transmitting their respective files simultaneously. In one embodiment, however, the local device may receive the file from a cloud storage (or server), at a later time, as previously described in FIG. 1. For instance, rather than transmitting the file directly to the local device, the remote audio capture device may transmit the file over the air (e.g., via a cellular network or the wireless network) to storage in the cloud. The local device may then retrieve the file (e.g., through selection of a UI item in the video capture application) at a later time. For instance, the local device may retrieve the file once a commend is received from the user (e.g., through a user selection of a UI item in the video capture application). In one embodiment, the local device may automatically retrieve the file based on various criteria (e.g., whether the local device is in a network). Allowing the local device to retrieve the file this way gives the user of the local device the flexibility to end the recording session, without having to wait while the remote audio capture device directly transmits the file to the local device, which may take time based on the size of the file. Also, this allows the file to be accessible by not only the local device but also other devices (e.g., a laptop) in which the user may want to listen to (or manipulate) the audio track in the file.

Upon receiving the files (from the remote audio capture devices and/or the cloud), the local device synchronizes (at block 415) video recorded by the local device and contained within a video track (e.g., first video track), an audio signal recorded by the local device and contained within an audio track (e.g., second audio track), and audio signals recorded by the remote audio capture devices and separately contained within audio tracks. In one embodiment, the local device may only capture video (e.g., without capturing audio), while the remote audio capture devices capture the audio for the recording session. Since the internal clocks of the remote audio capture device(s) were synchronized to the internal clock of the local device prior to the beginning of the recording session, the video and audio signals may be time-aligned. For instance, a start time of the video may be aligned with a start time of each of the audio signals and an end time of the video may be aligned with an end time of each of the audio signals. In one embodiment, other times stamps from of the video may be aligned with corresponding time stamps of the audio signals in order to give a more precise synchronization (e.g., time-aligned at every second).

Along with aligning the video with the audio signals, the local device may also synchronize sample rates of the audio signals. The sample rate, which is the amount of times an audio signal (e.g., waveform) is sampled in a second (e.g., 44.1 kHz, 48 kHz, or 96 kHz), is based on a frequency (e.g., clock rate) of an internal clock of the device capturing the audio signal. Typically, an internal clock is a crystal oscillator (found within a central processing unit (CPU) of the device), which produces a stable clock signal (e.g., through oscillation) as a fixed sine wave with a certain frequency. The sample rate is then set based on the frequency of the fixed sine wave, which may be equal to or a multiple of the clock rate of the internal clock. Since each crystal oscillator may have a slightly different error rating (e.g., 20 ppm or 50 ppm), however, a frequency of the sine wave produced by each device's crystal oscillator may deviate from the nominal value. For example, a crystal oscillator that is set to produce a sine wave at 48 kHz may actually produce a sine wave at 47.997 kHz or 48.111 kHz, based on its error rating. Hence, since each crystal oscillator may produce a sine wave with a slightly different frequency, each of the audio signals produced by the local and/or remote devices may have an actual sample rate that is different than a sample rate indicated by the devices. To calculate an actual sample rate of an audio signal, the local device may count the number of samples between the start time and the end time of the audio signal and divide that number by the time difference between the start time and the end time. In one embodiment, the actual sample rate may be calculated by counting samples in a segment (e.g., one minute) of an audio signal, rather than the entire signal. Once the local device computes the actual sample rate of each audio signal, the local device may perform a sample rate conversation to the audio signals in order for the audio signals to have a same sample rate. For example, the local device may resample (e.g., upsample and/or downsample) the audio signal of a particular audio track from a remote audio capture device in order to set a sample rate of the particular audio signal to a same (or similar) sample rate to the audio signal captured by the local device. This ensures that the audio signals are synchronized when mixed together, reducing any lip-sync error or phasing artifacts, for example.

Once the video and audio signals are synchronized, the local device intelligently mixes (at block 420) the video with the audio signals. To intelligently mix, the local device may analyze the video from the video track and/or the audio signal from each of the audio tracks in order to determine whether the audio signals should be manipulated and/or enhanced. For example, referring to FIG. 1, the local device 105 may intelligently mix audio signals that are recorded by the local device 105 and the remote audio capture device 120 by emphasizing the audio signal in the audio track from the remote audio capture device 120 based on a determination of whether the interviewee 110 is speaking. Specifically, the local device 105 may choose to emphasize this audio signal (thereby ducking the audio signal in the audio track from the local device 105) through the use of facial recognition (to determine whether the interviewee's mouth is moving) and voice detection in the audio signal (to determine whether there is speech or a high probability of speech). Hence, rather than requiring a user to manually perform a post-production process in order to mix the video and audio, this step performs these actions automatically and without user intervention. More about intelligently mixing the video and audio is further discussed in FIG. 5.

The process 400 stores (at block 425) the mix in a single multimedia file and/or multimedia container package at the local device. Along with storing the mix within the multimedia file (or package), in one embodiment, it may also contain the individual (unprocessed) video track(s) and/or audio track(s) and elements used to process the individual tracks (e.g., ducking values) used to create the mix, such that manual adjustments to the mix is permitted, and the individual unprocessed tracks may also be made available for optional manual post processing. The user of the local device may playback the mix in the video capture application or any application that is capable of video playback. In addition to playing back the mix, the user may also share the mix with others. For example, the user may transfer the file either directly (e.g., through AIRPLAY) to another device or to a cloud storage for other devices to later download. In one embodiment, the user may be automatically prompted (e.g., through the use of a pop-up screen) with an option to post the file to a social media website (e.g., FACEBOOK, INSTAGRAM, and TWITTER) in order to share the file with other users of the social media website. In another embodiment, the user must perform a selection of a UI item (e.g., a "Post" button) in order to post the file to a social media website. In one embodiment, along with containing the mix, the multimedia file may also contain the full video track and each of the full audio tracks as separate tracks. This gives the user the convenience of having an intelligent mix and the flexibility of having the separate tracks. For instance, the user may open the multimedia file in a video editing application (e.g., FINAL CUT PRO or IMOVIE) and manually generate a different mix (or adjust the intelligent mix) by using the separate tracks.

Figure 5:
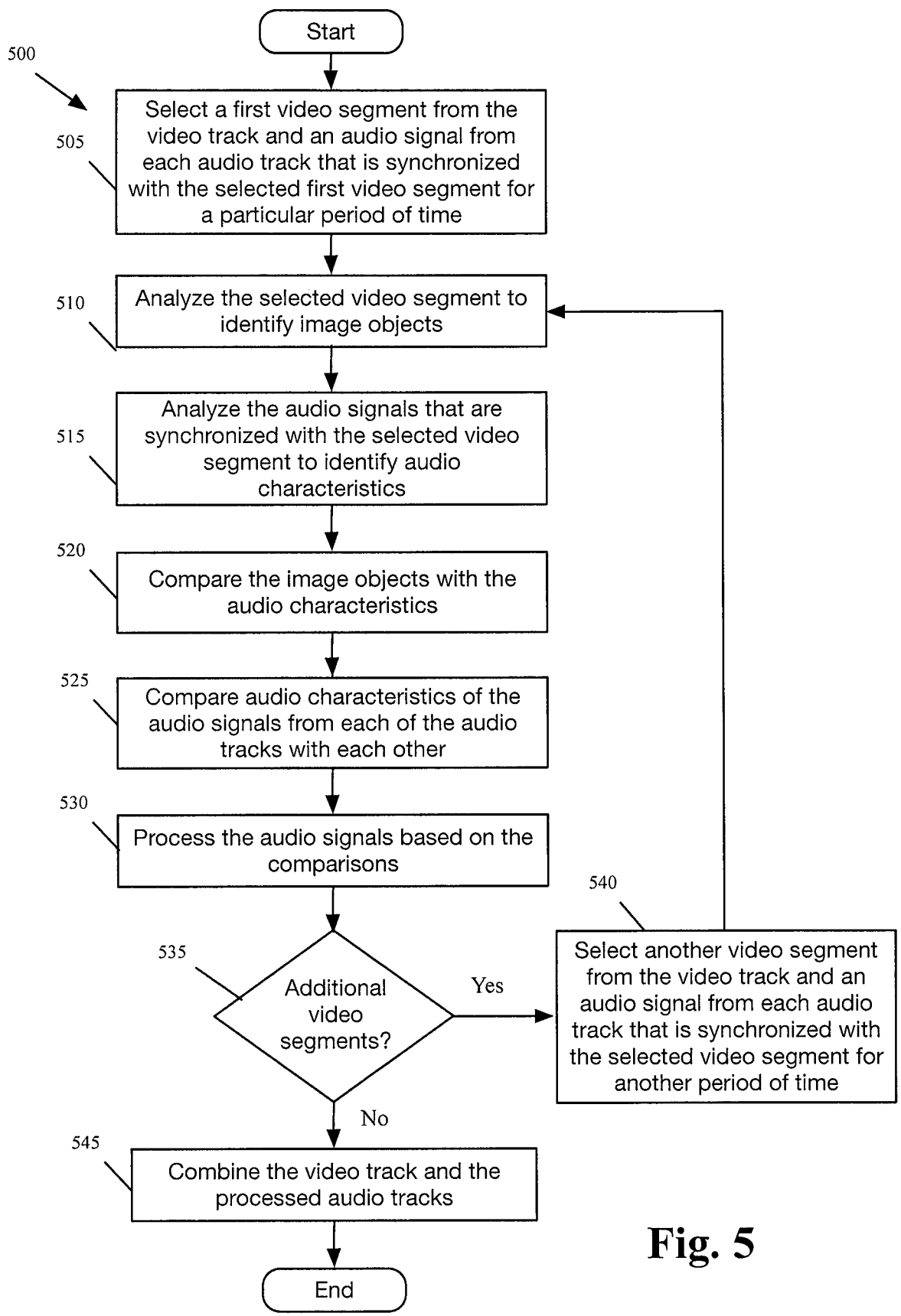
FIG. 5 shows a flowchart of one embodiment of a process to automatically and intelligently mix the video and audio captured with the double-system recording.

FIG. 5 is a flowchart of one embodiment of a process 500 to automatically and intelligently mix video and audio recorded by a local device and audio recorded by remote audio capture device(s). The process 500 will be described by reference to FIG. 1. As shown in FIG. 5, process 500 begins by selecting (at block 505) a segment of video (e.g., five video frames of a scene) from the video track recorded by the local device 105 and selecting an audio signal from each of the audio tracks (recorded by the local device 105 and the remote audio capture device 120) synchronized with the selected segment of video for a period of time (e.g., five seconds). In one embodiment, the time is based on a number of video frames (e.g., five video frames) contained with the selected segment. In another embodiment, the selected segment contains the entire video in the video track, along with the audio signals from each of the audio tracks in their entirety.

The process 500 analyzes (at block 510) the selected video segment to identify "image objects" that are used as indicators for helping to determine how the audio signals from the audio tracks should be processed. For instance, an "image object" may be specific objects (e.g., a car, a dog, and a person) contained within the video segment, may be a facial expression (e.g., smiling, talking, and blinking) of a person within the video segment, may be a particular scene or type of scene (e.g., sunset, beach, and forest) contained within the video segment, may indicate video quality characteristics of the video segment (e.g., whether the video segment is blurred), and may indicate display resolution of the video segment. In addition to identifying the image objects, the video segment may be analyzed to identify movement of image objects within the video segment (e.g., a person walking, a car driving, and a dog running). In one embodiment, the analysis of the video segment may indicate that a camera used to captured the video is moving (e.g., panning) based on the movement of several image objects within the scene. The analyzed video segments may indicate which audio signal should be ducked and which audio signal should remain the same (or enhanced) during playback of the mix. Furthermore, the analyzed video segments may also help to determine if a particular sound associated with an audio signal should be heard during playback of the mix or removed entirely.

As described previously, the video segment may be analyzed using facial recognition software to identify an image object of a person displayed within the video segment is speaking (e.g., mouth moving). Facial recognition may also be used to identify an image object of body cues (e.g., body language), which may indicate that sound is (or is going to be) produced by the person, such as blinking or other facial expressions (e.g., smiling). The video segment may also be analyzed to identify other image objects, which may include particular objects (e.g., animals and vehicles) within the scene that may produce sound. The selected video segment may also be analyzed to identify movement of the objects (or people) either within the scene or moving in and out of the scene. Using such movement, as described later, that identify objects or people moving in and out of the scene may be helpful to determine whether sound associated with the objects or people should either be heard or ducked during playback. In one embodiment, the selected video segment may be analyzed to identify an image object of a scene (e.g., sunset, beach, or forest) within the video segment. To do this, the video segment may be compared to predefined video segments that correspond to particular scenes in order to identify what scene is being displayed within the video segments. For example, the video segment illustrated on the display screen 140 of the interviewee 110 and the interviewer 115 in FIG. 1, may be compared with predefined video segments in order to identify an image object of a scene of an interview taking place.

The process 500 analyzes (at block 515) the audio signal from each of the audio tracks that is synchronized with the selected video segment to identify audio characteristics associated with the audio signals. The analysis may identify audio characteristics that are content-based, as well as signal-based. For example, as previously described in FIG. 5, the audio signal from each of the audio tracks may be analyzed to identify an audio characteristic of speech (or a probability in which the audio signal may contain speech), by using voice detection software. Other content-based audio characteristics may include a definition of certain sounds contained within the audio signal. To illustrate, an audio characteristic of a sound of a car's engine revving may be identified within an audio signal that synchronized with a video segment that shows a car's engine. To identify the audio characteristic, the audio signal may be compared with predefined audio signals that are already matched with corresponding audio characteristics. When a predefined audio signal matches (or at least partially matches) the audio signal associated with the sound of the car's engine revving, the audio signal is assigned the corresponding audio characteristic of the matched predefined audio signal (e.g., a revving engine). Examples of signal-based audio characteristics (e.g., signal properties) of the audio signals may include: an energy level of the audio signal, a signal-to-noise ratio of the audio signal, and a spectral shape of the audio signal. It should be understood that any signal-based property of the audio signal may be identified as an audio characteristic. In one embodiment, the analysis is performed without performing a comparison between audio signals. For instance, the audio signals may be analyzed using voice detection software (without comparing audio signals) to identify audio characteristics of speech.

The process 500 compares (at block 520) the image objects (and/or movement of the image objects) identified from the analyzed selected video segment with the audio characteristics identified from the audio signals from at least one of the audio tracks that is synchronized with the selected video segment in order to determine how the audio signals should be processed. In other words, based on the comparison of the image objects and audio characteristics, it may be determined that one audio signal from an audio track may need to be ducked (to give preference to another audio signal from another audio track). For example, referring back to FIG. 1, it may be determined that the audio signal from an audio track recorded by the local device 105 may need to be ducked in order to emphasize an audio signal from the audio track recorded by the remote audio capture device 120, during playback of the mix. For instance, an image object identified from a video segment from a video track recorded by the local device 105 may be of a person speaking (e.g., through facial recognition). An audio characteristic identified from an audio signal from the audio track recorded by the remote audio capture device may be identified as including speech or having a high probability of including speech (e.g., through voice detection). Therefore, knowing that speech accompanies an action of a person speaking, it may be determined that the audio signal from the audio track recorded by the remote audio capture device 120 should be heard (or emphasized), while all other audio signals from other audio tracks (e.g., the audio signal from the audio track recorded by the local device 105) should be ducked (or deemphasized), during playback of the mix. This determination may also be made based on an image object identified from the selected video segment that indicates the type of scene being displayed within the selected video segment is an interview. Since the image object indicates an interview is taking place, a comparison between the image object and an identified audio characteristic of the audio signal from the audio track recorded by the remote audio capture device 120 of speech, the same result (e.g., ducking the audio signal from the audio track recorded by the local device 105) may be reached.

Along with giving preference to one audio signal over another, the comparison between image objects and audio characteristics may be used to determine whether a certain audio signal within an audio track may need to be adjusted (e.g., either reduced or enhanced). To illustrate, assume that an identified audio characteristic of the audio signal from the audio track recorded by the remote audio capture device 120 from FIG. 1, is of a dog bark. The analysis of the selected video segment from the video track recorded by the local device 105, however, did not identify an image object of a dog or any animal that makes such a noise. Since a dog is not displayed within the selected video segment, it may be inferred that a director of the local device 105 did not want to include the dog (or the sound of a dog barking) in the scene, and therefore the bark should be ducked (or deemphasized) since it may be considered noise. The same may be true for sounds associated with other image objects. If an identified audio characteristic of an audio signal from an audio track recorded by the remote audio capture device 120 is of a sound of a horn, but the selected video segment did not identify an image object of a car, then the sound of the horn may be ducked. In this way, the comparison between the image objects (or movement of image objects) and audio characteristics can identify processes to be applied to the audio signals from the audio tracks in order to suppress noise that the director of the recording session did not intend to be included in the final mix.

The process 500 compares (at block 525) audio characteristics of the synchronized audio signals from each of the audio tracks with each other. As previously described, the comparison may include determining whether one of the audio signals includes an audio characteristic of a detection of speech or a greater detection of speech (or greater probability of detection of speech) than the other audio signals (e.g., through voice detection). The audio signal with such an audio characteristic may be emphasized over the other audio signals (with lesser to no detection of speech). Since audio characteristics may be of various signal properties (e.g., signal-to-noise ratio), these properties may be used to further determine how to process their corresponding audio signals. For example, an audio signal may need to be adjusted based on its signal-to-noise ratio in relation to signal-to-noise ratios of other audio signals from other audio tracks in the mix. Specifically, the audio signal may need to be ducked when it has a lower signal-to-noise ratio in comparison to another audio signal's signal-to-noise ratio. Another signal property that is helpful to determine how to process audio signals is an energy level (e.g., volume) of the audio signals. In one embodiment, the energy level may be one of an average energy level or a highest energy level of the audio signal from an audio track. Similar to the comparison of the signal-to-noise ratios, an audio signal may need to be ducked when it has a lower energy level in comparison to another audio signal's energy level. Another signal property relates to the spectral shape of an audio signal from an audio track. For instance, an audio signal may need to be adjusted when it is determined that there is more low frequency content than another audio signal of another audio track. In order to compensate, rather than ducking the audio track, in one embodiment, the audio track may need to be passed through a high-pass filter in order to remove the excess low frequency content.

Comparing audio characteristics may supply additional information for determining how audio signals should be adjusted. For instance, a comparison of audio characteristics may indicate location and/or distance information of each remote audio capture device with respect to each other and the local device. Knowing where each remote audio capture device is, in relation to the local device and each other, may be helpful in determining how and which audio signals associated with the remote audio capture devices (and the local device) should be ducked. A simple example may be a wedding, in which the local device, which is the videographer, may be wirelessly connected to three remote audio capture devices for recording audio from different participants in the wedding. A groom may have a lapel microphone connected to a first remote audio capture device located within his pocket, a best man may have a lapel microphone connected to a second remote audio capture device located within his pocket, and a bride may have a lapel microphone connected to a third remote audio capture device located within her pocket. Before the church ceremony begins in which the bride enters the church, the videographer may record the groom and best man while they are waiting at the altar. Since the third remote audio capture device being carried by the bride is not located near the other devices (because the bride is outside the church), audio signals being recorded by the third remote audio capture device may need to be ducked. Otherwise, if audio signals recorded from the third remote audio capture device were to be introduced during playback of the mix, the video may not contextually match the audio. In one embodiment, when it is determined that the third remote audio capture device is within a threshold distance from the local device (and/or the other remote audio capture devices), the audio signal recorded by the third remote audio capture device may not be ducked anymore because the device is close to the local and/or other remote devices, and therefore in the recorded scene.

In one embodiment, the distance and location information may be estimated through a propagation delay of an identified audio characteristic of a distinct audio event contained in each audio signal. For example, using an audio characteristic present (e.g., the distinct audio event) in each audio signal (e.g., a "clap" sound) and timestamp information indicating the moment at which each audio signal experiences the clap, the distance (and relative location) between each of the devices may be estimated. For example, by knowing when the clap sound occurs in each audio signal, distance and location information may be estimated based on the time (using the timestamp information) between each occurrence of the clap sound in each audio signal. Then, audio signals recorded by a remote audio capture device may be ducked based on its estimated location relative to the other devices (e.g., because it is estimated to be located behind the local device, and therefore should not be included in the mix). In one embodiment, estimated location and distance information may be combined with other previously described analyses to make a determination of which audio signals should be ducked. For example, along with knowing an estimated distance and location of each device with respect to each other, a determination may be further based on the comparisons of image objects and/or audio characteristics. For example, an audio signal of a remote device may be ducked based on (i) its estimated location (e.g., behind the local device) and (ii) another audio signal from another remote device having an audio characteristic associated with "on-camera action" (e.g., a detection or greater probability of detection of speech), while the audio signal from the remote device behind the local device does not have the same (or similar) audio characteristic. In another embodiment audio signals recorded by a remote audio capture device with an estimated distance meeting and/or exceeding the threshold distance from one of either the local device or the other remote audio capture devices may be ducked.

In one embodiment, other information may be used to determine distances between the local and remote audio capture devices. For example, distance may be estimated using signal strength (e.g., received signal strength indicator of WiFi and/or BLUETOOTH protocol) data of each remote audio capture device's communication link with the local device, while in the recording session. For example, distance between the remote device and the local device may be proportional or in relation to the remote device's signal strength data. This data may be recorded in real-time as metadata attached to each audio track recorded by the remote audio capture devices. A determination of which audio signal from a remote audio capture device should be ducked may be based on the estimated distance, used in conjunction with e.g., a comparison of the image objects (e.g., whether a person is in the scene) and audio characteristics (e.g., whether speech is coming from that person), as previously described at block 520. For example, elaborating on the previous example, assume that a first person with a first remote device is standing in front of the camera of the local device (e.g., in the scene) interviewing another person (as shown in FIG. 1), while a second person with a second remote device is standing right behind the camera (e.g., out of the scene). Although the second remote device may be closer (e.g., based on the estimated distance information) to the camera then the first remote device, the audio signal from the second remote device may be ducked, since it is (i) further from the first remote device then the local device and/or (ii) not associated with any on-camera action (e.g., the audio signal does not contain speech to be associated with the person talking in the video captured by the local device's camera). In addition, distance information (and location information) may be based on information acquired from other applications running on the local and remote audio capture devices (e.g., GPS coordinates).

In addition to comparing image objects and audio characteristics, other data may be used to determine how to process the audio signals, such as, accelerometer or inertia sensor data that is used to measure device movement (e.g., speed and direction) during the recording session. This sensor data may be used with location information and distance information to determine which audio signal should be ducked. For instance, an audio signal from an audio track recorded by a remote audio capture device may be ducked if its sensor data (e.g., the data received in the file containing the audio track, as described at block 410 of FIG. 4) indicates that it is moving away from the local device (e.g., behind the local device's camera). In one embodiment, the local device may use this data to determine camera movement, which when compared with distance and location information of the remote audio capture devices, may be used to determine which audio signals from which devices may need to be ducked. To illustrate, assume there is a first person using a first remote audio capture device and a second person using a second remote audio capture device, and using distance information (e.g., based on signal strength of each remote device) and/or location information (e.g., based on propagation delay), it is known that the first person is in the scene (of a selected video segment), while the second person is out of the scene (e.g., standing right behind the camera). At this point, as the second person is not in the scene, an audio signal from an audio track recorded by the second remote audio capture device is to be ducked. However, as the local device's sensor data indicates that the camera is moving (e.g., panning) from the first person to the second person, using the measured accelerometer and/or inertia sensor data to identify the camera movement, the audio signal recorded by first remote audio capture device may now be ducked in order to emphasize the audio signal from the audio track recorded by the second remote audio capture device.

The process 500 processes (at block 530) synchronized audio signals from each audio track based on the comparisons and any other data that may indicate how the synchronized audio signals should be processed. In one embodiment, the synchronized audio signals are to be processed by generating ducking values and applying the ducking values to the audio signals based on the comparisons and other data. To illustrate, referring back again to FIG. 1, recall that the analysis of the video segment from the video track recorded by the local device 105 identified an image object (e.g., based on facial recognition) of a person speaking (e.g., the interviewee 110). The analysis of the audio signals synchronized with the video segment, identified an audio characteristic of speech (e.g., through voice detection). The image object and the audio characteristic were then compared to determine that the audio signal from the audio track recorded by the remote device 120 should be emphasized, while the audio signal from the audio track recorded by the local device 105 should be ducked (or deemphasized). Based on the comparison, ducking values may be generated and applied to the audio signal from the audio track recorded by the local device 105, such that during playback of a mix of the video and two audio signals (one from the local device 105 and one from the remote device 120), sound associated with the audio signal from the audio track recorded by the remote device 120 is emphasized. In one embodiment, the application of the ducking values effectively mutes an audio signal from an audio track in which it is applied, while, in other embodiments, the application of the ducking values reduces a volume level of the audio signal from the audio track by a percentage or threshold, which may be based on the comparison or other information. For instance, if it is determined that the audio signal from the audio track recorded by the remote device 120 should be more emphasized than the audio signal from the audio track recorded by the local device 105, and both audio signals have high volumes, then high ducking values may be applied to the audio signal from the audio track recorded by the local device 105. If the two audio signals have volumes that differ greatly (e.g., one having a higher volume level than the other), however, lesser ducking values may be applied. In one embodiment, Dynamic Range Control/Compression (DRC) gain values may be generated and applied to the audio signals based on the comparisons and any other data. DRC reduces the volume of loud sounds or amplifies quiet sounds by narrowing or compressing an audio signal's dynamic range.

Other processes, such as audio processing operations, may be performed on the audio signals. For instance, a noise suppression operation may be performed on an audio signal from one of the audio tracks based on the comparison of the audio characteristics. Such a comparison may identify that the audio signal in which the noise suppression operation is to be applied has a lower signal-to-noise ratio. In one embodiment, a noise suppression operation may be applied to each audio signal based on its signal-to-noise ratio (e.g., proportional to its signal-to-noise ratio). Such suppression will enable a user to hear sounds more clearly, while the audio signal is being played back. Also, rather than applying ducking values, in one embodiment, the gain (e.g., volume) of an audio signal may be amplified based on the comparison. Furthermore, as previously described, based on a comparison of the spectral shapes of several audio signals, the spectral shape of an audio signal may be modified (e.g., applying a high-pass filter in order to remove excess low frequency content). It should be understood that any signal processing operation that enhances user experience may be applied based on the comparison of audio characteristics.

Additional pre-recorded audio may be added based on the comparisons and the other information. For example, audio (e.g., sound) effects (e.g., reverbs, delays, modulations, distortions, bass enhancement, and pitch correction) may be added to audio tracks based on the comparisons and the other information. Furthermore, sound tracks (e.g., musical compositions) may also be added, such that they are played back as background music (e.g., played back at a lower volume than at least one other audio track) for at least a portion of the mix. For instance, the added sound tracks may be adjusted (e.g., scaled and faded) based on the comparisons and any other information. In one embodiment, however, the added sound tracks may be a predominate sound during portions of the mix (e.g., a narration of the mix).

The process 500 determines (at block 535) whether there are additional video segments within the video from the video track captured by the local device that needs to be analyzed. When there is an additional video segment of video from the video track, the process 500 selects (at block 540) the additional video segment and audio signals from each audio track that is synchronized with the selected additional video segment for another period of time. In one embodiment, the period of time may be the same amount of time used to select the first video segment, while in another embodiment, the amount of time may change. The process 500 then returns back to block 510 in order to analyze the selected additional video segment and synchronized audio signals. Otherwise, if there are no additional video segments, the process 500 combines (at block 545) the video track and the audio tracks with the processed audio signals in order to create a mix. In one embodiment, rather than combining tracks, video from the video track and the processed audio signals from the audio tracks are combined to create the mix. In one embodiment, rather then storing several different audio tracks, the mix may include a single audio track containing (either separate or combined) audio signals captured by the local device and remote devices. After the mix is created, the process 500 ends.

Some embodiments perform variations of the process 500. For example, the specific operations of the process 500 may not be performed in the exact order shown and described. The specific operations may not be performed in one continuous series of operations, and different specific operations may be performed in different embodiments. For instance, in one embodiment, the process 500 is performed by analyzing the synchronized audio signals without analyzing the selected video segment, such that once video segment is selected, the process 500 may proceed to block 515 and once the audio characteristics are identified, the process 500 may proceed to block 525. This may occur in order to reduce the number of computations to be performed in order to generate the mix. In addition, in one embodiment, some specific operations may be performed simultaneously. For example, rather than separately comparing and processing the audio signals (e.g., as described in blocks 520-530), these operations may be performed at the same time, such that when it is determined a particular audio signal is to be deemphasized, ducking values may then be generated and applied to the audio signal. In another embodiment, rather than waiting for the recording session to end in order to generate the mix, it may be generated while the recording session is in process. For example, during a recording session, may receive audio signals from the remote audio capture devices in real-time (or at least partially in real-time) as the devices are recording audio. These audio signals may then be analyzed and compared (as described in FIG. 5) with video and an audio signal from the local device in order to generate the mix, while the recording session is in progress. In another embodiment, rather than analyzing each of the recorded audio signals from the local and remote devices, a subset of the recorded audio signals or portions from each of the recorded audio signals may be analyzed to identify audio characteristics.

The double-system disclosed thus far includes a local device that records video and audio, and remote audio capture devices (e.g., remote devices) that record audio. This does not necessarily need to be the case. For example, since the remote devices may be similar devices to that of the local device (e.g., each being an IPHONE, manufactured by Apple Inc.), the remote devices have the capability to record both audio and video. Hence, the mix may then be generated using several different videos, as well as several different audio signals. To initiate and perform a recording session with such double-system recording (e.g., having several devices recording video and audio), several operations discussed thus far with double-system recording in which only a single device (e.g., local device) records video would remain the same, while some others may differ slightly. For instance, it should be understood that operations described in FIG. 3 relating to synchronizing remote devices with a local device, and beginning a recording session may be similar in both double-system recordings. Also, operations described in FIG. 4 relating to terminating the recording session and synchronizing tracks may be similar.

Operations, on the other hand, that may differ relate to selecting a remote device to record video, as well as audio, and automatically and intelligently mixing several video tracks with several audio tracks. For instance, with respect to selecting a remote device (as previously described in block 310 of FIG. 3) the user of the local device may also select the remote device to capture one of video, audio, or a combination of video and audio. For example, when the user of the local device selects the UI item (corresponding to a remote device candidate) displayed on the display screen 140, the user may be prompted to select whether the remote device is to capture one of video, audio, or a combination of video and audio. In one embodiment, the determination of whether a remote device captures video and/or audio may be based on whether an external microphone (e.g., microphone 125) is connected (via wire or wirelessly) to the remote device. While, in other embodiments, the selection is automatic and without user intervention. Operations to automatically and intelligently mix video and audio described in FIG. 5 may differ, because an additional analysis may be required to mix the several video tracks together with the audio tracks. More about this is described in FIG. 6.

Figure 6:
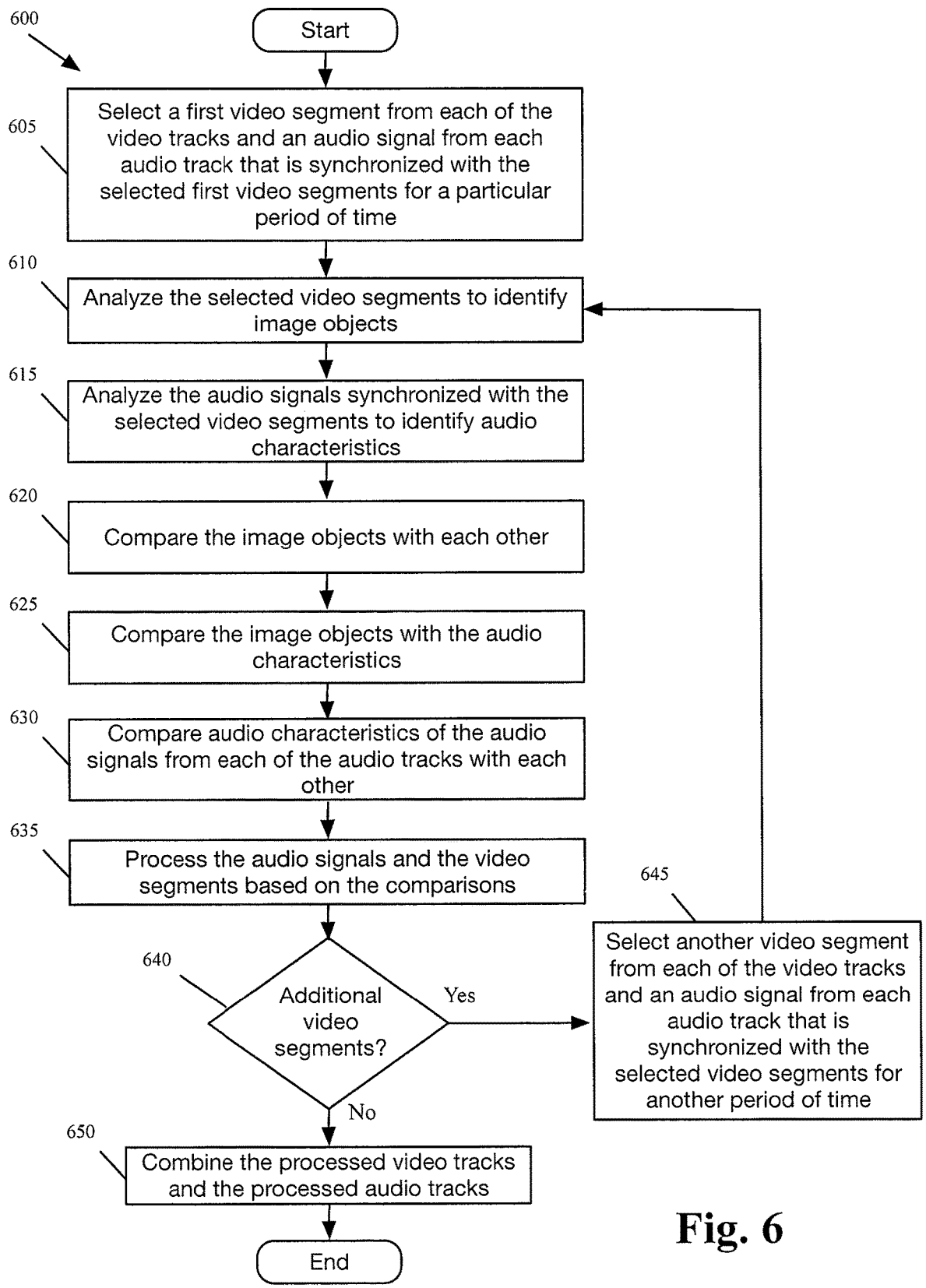
FIG. 6 shows a flowchart of another embodiment of a process to automatically and intelligently mix the video and audio captured with the double-system recording.

FIG. 6 is a flowchart of one embodiment of a process 600 to automatically and intelligently mix video and audio recorded by a local device and at least one remote device. Process 600 is similar to process 500, of FIG. 5, such that video and audio is intelligently mixed. Process 600 differs from process 500, in that rather than intelligently mixing with a single recorded video track, process 600 intelligently mixes with several recorded video tracks (e.g., one recorded by the local device and at least one recorded by a remote device). For the sake of brevity, since processes 600 and 500 perform similar operations, the following discussion of FIG. 6 will emphasize the differences between the two processes. It should be understood that any detail not discussed with respect to process 600 may be found in the description of process 500.

As shown in FIG. 6, process 600 begins by selecting (at block 605) a segment of video (e.g., a scene) synchronized in each of several recorded video tracks (e.g., a video segment from a local device and a corresponding video segment from a remote device) and selecting an audio signal (or a portion of an audio signal) from each of several recorded audio tracks synchronized with the selected video segments for a period of time. The process 600 analyzes (at block 610) the selected video segments to identify image objects and/or movement of image objects) that may be used as indicators for helping to determine how the audio signals and the video segments should be processed. The process 600 analyzes (at block 615) the selected audio signals synchronized with the selected video segments to identify audio characteristics that may be used as indicators for helping to determine how the audio signals and the video segments should be processed.

The process 600 compares (at block 620) the image objects (and/or movement) identified from the analyzed video segments with each other in order to determine how the video segments should be processed. In other words, based on the comparison of the image objects with each other, it may be determined that one video track should be displayed to the user during playback, rather than (or over) another. Unlike several audio signals that may be mixed together and processed, such that when played back, a user may hear sounds associated with each of the audio signals (e.g., foreground and background sounds), video from one video track may be displayed to the user at any given time. Therefore, when it is determined that one video track should be displayed over other recorded video tracks, an effect may need to be performed on the other video tracks, such that they are deemphasized, or not displayed during playback. More about the effects and how to choose which would be proper is described later.

As previously mentioned in FIG. 5, image objects and/or movement of image objects may be compared in order to determine how video segments should be processed. Examples are as follows. For instance, movement of objects within a scene may be used to determine how the video segments should be processed. For example, one video segment may have priority (and therefore may be displayed over other video segments) if it includes a lot of movement of image objects, as opposed to other video segments. On the other hand, if movement of image objects within the video segments are relatively the same (e.g., different shots of a same scene), a determination of which video segment should be displayed may be based on which video segment is of better video quality (e.g., blurring). Along with being based on movement of image objects, the determination may also be based on a comparison of image objects with predefined image objects. For example, the image objects identified within a video segment may be compared with predefined image objects that are known to correspond with video segments that are to be emphasized (or displayed) over other video segments. This may be done through use of a priority ranking. For instance, an image object from a video segment of a person speaking (e.g., known through facial recognition software, as previously described), may have a higher priority ranking than an image object from another video segment of a background (e.g., having mountains). In another embodiment, image objects that indicates what type of scene (e.g., sunset, beach, and forest) is in the video segments may be compared. It should be understood that any type of image object identified in the video segments may be compared with corresponding image objects within the other video segments in order to determine which video segment is to be displayed. In one embodiment, the comparing image objects may also help to indicate how synchronized audio signals should be processed.

The process 600 compares (at block 625) the image objects (and/or movement of image objects) with the audio characteristics identified from the audio signals from the audio tracks that are synchronized with the selected video segments in order to determine how the video segments and the audio signals should be processed. In other words, this comparison may not only determine how the audio signals may need to be processed (e.g., ducked) but also further determine how the video from the video tracks may need to be processed (e.g., an application of a transition effect). For instance, referring back to the previous example, a comparison of the image objects may have determined that a video segment, which includes a person speaking, may have priority. If the audio characteristics identify speech or a high probability of speech (e.g., through voice detection), then it may be determined which of the audio signals should accompany the video segment. Furthermore, by identifying audio characteristics that include speech, the comparison may confirm that a video segment having an image object of a person speaking, is in fact the video segment that is to be displayed over the other video segments. If none of the audio characteristics identify speech, however, the priority of the video segments may change. In this case, a comparison of the audio characteristics may identify not only a particular audio signal that should be emphasized, but also a different video segment that should be displayed over the other video segments. For instance, if the audio characteristics of each of the audio signals have a low signal-to-noise ratio (e.g., a lot of background noise), a video segment having an image object of a stadium may now have priority, over a video segment having an image object of a close up of a person because such a video segment may be associated with an audio signal having a high signal-to-noise ratio. The process 600 compares (at block 630) the audio characteristics identified from the audio signals from the synchronized audio tracks in order to determine how the audio signals should be further processed.

The process 600 processes (at block 635) the video segments and the audio signals based on the comparisons and any other data (as described previously in FIG. 5) that may indicate how the video segments and audio signals should be processed. As described in FIG. 1, the audio signals may be processed by generating ducking values and applying the ducking values to the audio tracks and/or performing audio processing operations based on the comparisons and other data. With respect to processing the video segments, transition effects may be generated and applied. For instance, a transition effect, such as a wipe, fade out, or any type of transition effect may be generated and applied to the video segments that are to be deemphasized. For instance, the application of a transition effect to a (e.g., first) video signal may result in the video signal seguing from an end of a scene in the video signal to a start of a scene in another (e.g., second) video signal. In one embodiment, rather than generating a transition effect, the video segments that are to be deemphasized may be cut entirely, such that only the emphasized video segment is displayed during playback. In one embodiment, the determination of which transition effect should be applied may be based on the comparisons above, or based on whether there was a transition effect previously applied to this video segment (based on a previous analysis). In one embodiment, rather than only showing a single video segment during playback, the video segments may be processed such that several video segments are to be displayed during playback. For example, based on the comparison of the image objects and/or audio characteristics, it may be determined that several video segments are to be displayed (e.g., in a split screen). Therefore, the video segments may be processed such that a portion of a viewing area displays one video segment, while another portion of the viewing area displays another video segment.

The process 600 determines (at block 640) whether there are additional synchronized video segments within the video tracks that need to be analyzed. When there are additional synchronized video segments of the video tracks, the process 600 selects (at block 645) the additional synchronized video segments from each video track and audio signals from each audio track that are synchronized with the selected additional synchronized video segments for another period of time. The process 600 then returns back to block 610 in order to analyze the selected additional synchronized video segments and synchronized audio signals. Otherwise, if there are no additional synchronized video segments, the process 600 combines (at block 65) the processed video tracks and the processed audio tracks in order to create the mix. After the mix is created, the process 600 ends.

Some embodiments perform variations of the process 600. For example, the specific operations of the process 600 may not be performed in the exact order shown and described. The specific operations may not be performed in one continuous series of operations, and different specific operations may be performed in different embodiments. For instance, in one embodiment, the process 600 is performed by analyzing the synchronized audio signals without analyzing the selected video segments, such that once video segments are selected, the process 600 may proceed to block 615 and once the audio characteristics are identified, the process 600 may proceed to block 630. This may occur in order to reduce the number of computations to be performed in order to generate the mix. In addition, in one embodiment, some specific operations may be performed simultaneously. For example, rather than separately comparing and processing the video segments and audio signals (e.g., as described in blocks 620-635), these operations may be performed at the same time.

Figure 7:
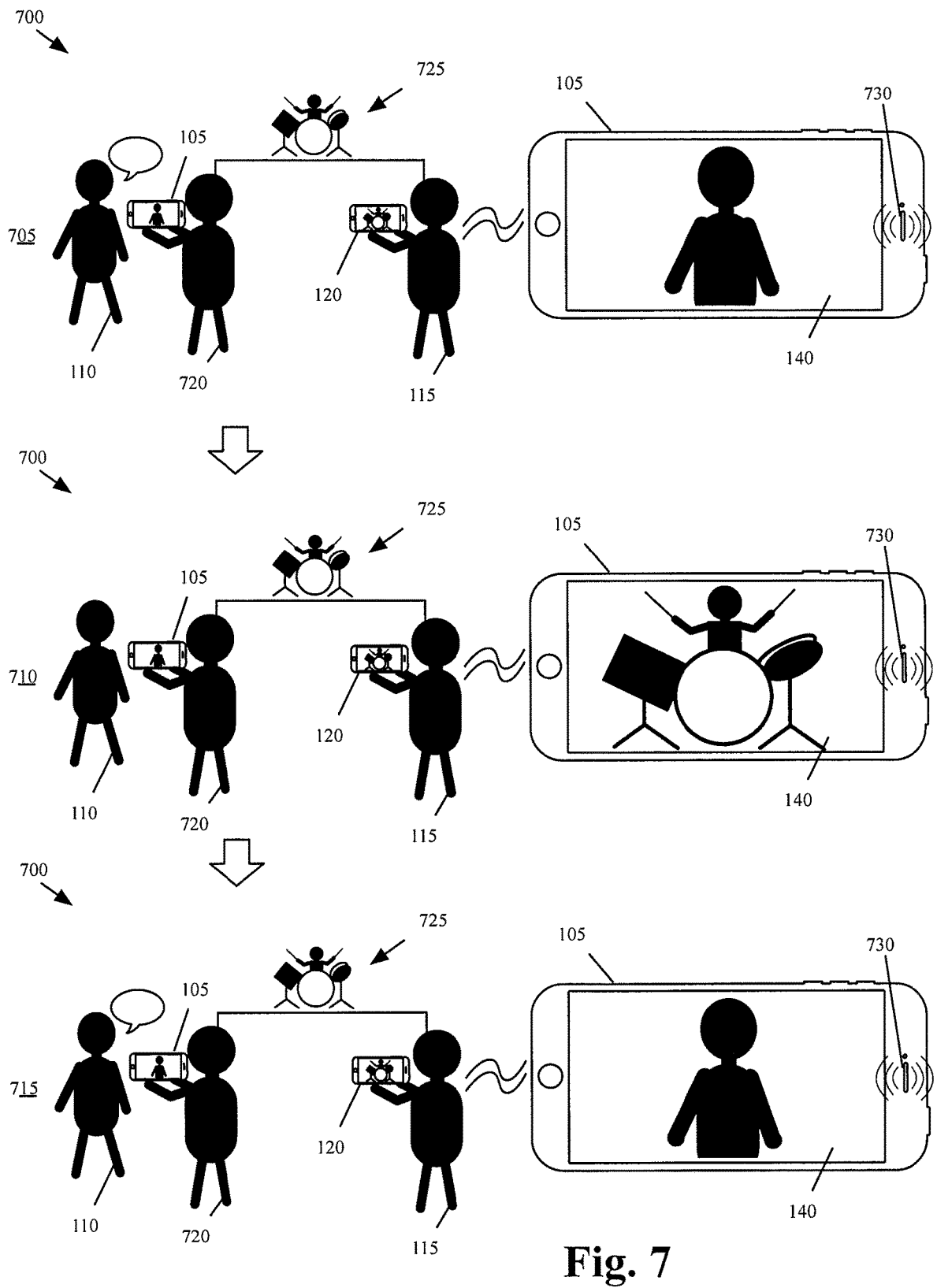
FIG. 7 shows a progression of various stages, in which a local device and a remote device capture video and audio in a recording session, and a corresponding preview of the final mix.

FIG. 7 shows an audio-visual recording session 700 in which a local device 105 and a remote device 120 are both recording video and audio simultaneously. Specifically, this figure illustrates three stages 705-715 of a recording session 700 in which the local device 105 is recording video and audio of an interview, while remote device 120 is recording video and audio of a rock band 725 that is playing in the distance. Although not shown, each device is capturing video using a built-in camera (similar to camera 155) and capturing audio using a built-in microphone (similar to microphone 130). Each stage also includes a preview 140 of the final product of the audio-visual recording session 700, after video and audio tracks from the local device 105 and remote device 120 have been synchronized, intelligently mixed, and combined into a mix, as previously described in FIGS. 4-6.

Stage 705 illustrates a point during the recording session 700, in which a camera person 720 is conducting an interview with interviewee 110, who is speaking at this point, while recording video and audio of the interview with the local device 105. At the same time, camera person 115 is using remote device 120 to record video and audio of the rock band 725 playing a set in the background. As shown by the enlarged local device 105, the final mix of the audio and video from both devices will result in video from the video track recorded by the local device 105 being displayed in the display screen 140 and sound associated with an audio signal from an audio track recorded by the local device 105 being played back through speaker 730 because the interviewee 110 is speaking. An explanation is as follows. Once the recording session 700 has been terminated, the video and audio tracks from both devices will be intelligently mixed (pursuant to FIGS. 5-6). As illustrated by the local device 105, the final mix will result in a video segment (e.g., interviewee 110 speaking) from a video track recorded by local device 105 being displayed in the display area 140 and sound associated with an audio signal (e.g., the interviewee's 110 voice) from an audio track recorded by the local device 105 being played back through speaker 730. The decision to playback the video and audio from the local device 105 may be based on the analysis of video segments from the video tracks recorded by the local and remote devices and synchronized audio signals from the audio tracks recorded by the local and remote devices in order to identify image objects (and/or movement of image objects) and audio characteristics. Once identified, the image objects and audio characteristics may be compared with each other in order to determine how the video segments and synchronized audio signals should be processed, pursuant to the operations previously described in FIGS. 5-6. For example, it may be determined that a video segment from the video track recorded by the local device 105 may have priority over a video segment from the video track recorded by the remote device 120 because an analysis of the video segment identified an image object of a person speaking (e.g., interviewee 110). With an identification of a person speaking, it may be determined to use an audio signal from the audio track recorded by the local device 105 because it includes audio characteristics that identify speech in the audio signals that may accompany the person speaking from the video segment. However, the determination of which audio signal to use may be based on an analysis of the audio signals themselves (e.g., to identify which has a greater detection of speech). Hence, when the video and audio tracks are processed, ducking values may be applied to the audio signals from the remote device 120 and a transition effect may be applied to the video segment from the recorded video track from the remote device 120 in order to emphasize the video and audio recorded by the local device 105.

In one embodiment, the determination to emphasize the video and audio recorded by the local device 105 may be made based on the comparison of the audio characteristics from the audio signals of the audio tracks recorded by the local device 105 and remote device 120. For instance, as described above, an analysis of the audio signal from the audio track recorded by the local device 105 may identify audio characteristics that indicate speech. An analysis of the audio signals from the audio track recorded by the remote device 120, however, may identify only the band 725 playing in the background. Hence, based on a comparison between the audio characteristics between the two audio signals, it may be determined that the audio signal from the audio track recorded by the local device 105 should be emphasized because it contains speech. In another embodiment, this determination may be based on a comparison of both audio signals' signal-to-noise ratios. Once it is determined which audio signal should be predominate, a video segment from one of the video tracks may be deemed more predominate over a video segment form the other video track based on the determination. For instance, since the audio track from the local device 105 is accompanied by a video track with video that was recorded simultaneously with the audio signal from the audio track, a video segment from this video track may be selected to be emphasized over a video segment from the video track recorded by the remote device 120. This way, video and audio recorded by one device (e.g., local device 105) may be presented during playback of the final mix.

Stage 710 illustrates another point during the recording session 700 (e.g., after a certain amount of time has passed), in which the camera person 720 is still conducting the interview and camera person 115 is still recording the rock band 725. However, at this point, interviewee 110 has stopped speaking. As a result, the final mix, shown by the enlarged local device 105, shows video from the video track recorded by the remote device 120 being displayed in the display area 140 and sound associated with an audio signal from the audio track recorded by the remote device 120 being played back through speaker 730. Since the interviewee 110 has stopped speaking, the analysis of the video and audio signals from the local and remote devices has determined that the band 725 should be emphasized. This may be due to a comparison of both audio signals' signal-to-noise ratios, or other signal properties. For example, since the camera person 115 is closer to the rock band 725, the audio signal recorded by the remote device 120 may have a larger signal-to-noise ratio than the audio signal recorded by the local device 105. In one embodiment, an analysis of the video segments may also lead to the determination that the video and audio from the remote device 120 should be emphasized (e.g., an image object of a rock band may have a higher priority than an image object of a person standing in a scene, who is not speaking). As a result, ducking values may be generated and applied to the audio signal from the audio track recorded by the local device 105 and a transition effect (e.g., a fade effect) may be applied to a video segment from the video track recorded by the local device 105. In one embodiment, the transition effect is applied to the beginning of the video segment, such that it shows a transition of interviewee 110 speaking (from stage 705) to the rock band 725 playing.

Although the previous examples have illustrated that an audio signal and video, which are emphasized, both originate from the same device (e.g., local device 105), this is not necessarily required. Rather than emphasizing the (e.g., second) audio signal from the audio track recorded by the remote device in stage 710, along with the (e.g., second) video signal from the video track recorded by the remote device, in one embodiment, the (e.g., first) audio signal recorded by local device 105 may be emphasized. For example, since the interviewee 110 is not speaking and the audio signals from the audio tracks recorded by both the local and remote devices include sounds of the rock band 725 (e.g., music), audio signals from either audio track may be used. The determination of which audio signal to emphasize may be based on a comparison of the audio signals' audio characteristics. For instance, the audio signal from the audio track recorded by the local device 105 may be used if it has a larger signal-to-noise ratio than the (e.g., second) audio signal from the audio track recorded by the remote device 120. In another embodiment, the same result may be reached based on a comparison between audio characteristics and image objects in audio and video signals recorded by the local and remote devices. For example, the determination to emphasize the first audio signal and the second video signal, may be due to the fact that a greater amount of speech has been detected (or a higher probability of detected speech) in the first audio signal than the second audio signal, and the second video signal includes an image object of the lead singer in the rock band 725 talking (e.g., through facial expressions).

Stage 715 illustrates another point during the recording session 700 (e.g., after more time has passed), in which the camera person 720 is still conducting the interview and the camera person 115 is still recording the rock band 725. However, similar to the first stage 705, the interviewee 110 has continued to speak, resulting in the final mix, shown by the enlarged local device 105, showing video from the video track recorded by the local device 105 being displayed in the display area 140 and sound associated with an audio signal from the audio track recorded by the local device 105 being played back through speaker 730. The determination to switch between the second video signal and the second audio signal from the remote device 120, back to the first video signal and the first audio signal from the local device 105 may be based on similar reasons to those given in stages 705-710. For example, the first video and audio signals recorded by the local device 105 may be emphasized (through the application of ducking values to the audio signal from the audio track recorded by the remote device 120 and a transition effect to the video from the video track recorded by the remote device 120) due to the fact that speech has been detected in the first audio signal from the audio track recorded by the local device 105 and a person speaking (e.g., the interviewee 110) has been detected in a video segment from the first video signal recorded by the local device 105.

In one embodiment, some of the constituent operations for generating the mix (described in FIGS. 5-6) may be performed remotely by a server, particularly those that might be computationally intensive, such as the video and audio signal analysis described, for example, in blocks 510 and 515 of FIG. 5 and blocks 610 and 615 of FIG. 6. For example, the local device could transmit the video track that has video recorded by the local device and audio tracks with audio signals recorded by the local and remote devices to the server and request the server to perform an analysis on the video and audio signals. In one embodiment, rather than the local device transmit the tracks from the remote devices, the remote devices may directly transmit these audio tracks to the server, as previously described in FIG. 4. Then, the local device would receive the results of such analysis, which would then be used to decide how to process (e.g., duck) the audio signals, for example.

An embodiment of the invention may be a non-transitory machine-readable medium (such as microelectronic memory) having stored thereon instructions, which program one or more data processing components (generically referred to here as a "processor") to perform the digital audio processing operations described above including receiving, triggering, sending initiating, signaling, generating, analyzing, comparing, applying, and combining. In other embodiments, some of these operations might be performed by specific hardware components that contain hardwired logic (e.g., dedicated digital filter blocks). Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. A method performed in a first portable electronic device for automatically producing a video and audio mix, the method comprising:

performing a network discovery process through a wireless network, that finds a second portable electronic device, wherein the network discovery process establishes a wireless connection with the second portable electronic device;

receiving, by the first portable electronic device, a request to capture video and sound for a double system recording session;

in response to the request, sending to the second portable electronic device, through the wireless connection, a message indicating when the second portable electronic device is to start recording for the double system recording session;

initiating the double system recording session, wherein both the first and second portable electronic devices record concurrently;

in response to the first portable electronic device stopping the recording of its video and sound for the double system recording session, signaling the second portable electronic device, through the wireless connection, to stop recording for the double system recording session; and in response to the first portable electronic device receiving a first audio track from the second portable electronic device that contains an audio signal recorded by the second portable electronic device during the double system recording session, automatically generating a video and audio mix with (i) the audio signal from the first audio track, (ii) an audio signal recorded by the first portable electronic device and contained within a second audio track, and (iii) video recorded by the first portable electronic device and contained within a video track, wherein one of the audio signals from the first and second audio tracks is ducked relative to the other in the mix, wherein automatically generating the video and audio mix includes:

analyzing a video segment of the video recorded by the first portable electronic device, to identify an image object within the video segment;

in response to identifying the image object, applying, independent of locations of the image object within the video segment, ducking values to the audio signal from the second audio track such that the audio signal from the second audio track is deemphasized, relative to the audio signal from the first audio track, during playback of the mix, the image object being a source of the audio signals from both the first audio track and the second audio track; and combining the video from the video track, the audio signal from the first audio track, and the audio signal with the applied ducking values from the second audio track into the mix.

2. The method of claim 1, wherein the image object is identified and comprises one of a facial expression of a person within the video segment, an object within the video segment, or a scene within the video segment.

3. The method of claim 1, wherein automatically generating the video and audio mix comprises applying, based on audio characteristics of (1) the audio signal from the first audio track and (2) the audio signal from the second audio track, ducking values to the audio signal from the second audio track in order to deemphasize the audio signal from the second audio track, relative to the audio signal from the first audio track, during playback of the mix.

4. The method of claim 3, wherein when an audio characteristic of the audio signal from the first audio track is a first signal-to-noise ratio and an audio characteristic of the audio signal from the second audio track is a second signal-to-noise ratio, ducking values are applied to the audio signal from the second audio track in response to the first signal-to-noise ratio being greater than the second signal-to-noise ratio.

5. The method of claim 3, wherein when an audio characteristic of the audio signal from the first audio track is a first detection of speech and an audio characteristic of the audio signal from the second audio track is a second detection of speech, ducking values are applied to the audio signal from the second track in response to the first detection of speech being assigned a greater probability than the second detection of speech.

6. The method of claim 1, wherein the video track recorded by the first portable electronic device is a first video track, and wherein in response to the first portable electronic device receiving a second video track from the second portable electronic device that contains video recorded by the second portable electronic device during the double system recording session, automatically generating the mix further comprises:

analyzing the audio signals from both the first and second audio tracks to identify an audio characteristic;

upon identifying the audio characteristic, applying a transition effect to the video from the first video track, to transition the video in the mix from the first video track to the second video track when displayed during playback; and combining (i) the video from the first video track with the applied transition effect, (ii) the video from the second video track, (iii) the audio signal from the first audio track, and (iv) the audio signal from the second audio track into the mix.

7. The method of claim 6, wherein the transition effect is one of a cut, a wipe, or a fade out effect.

8. The method of claim 1 further comprising synchronizing, prior to sending the message indicating when the second portable electronic device is to start recording, an internal clock of the first portable electronic device with an internal clock of the second portable electronic device by sending to and receiving from the second device synchronization messages, wherein upon initialization of the double system recording session, the first portable electronic device starts to record video and sound at a same start time as the second portable electronic device starts to record, according to the synchronized internal clocks of both the first and second portable electronic devices.

9. The method of claim 8, wherein automatically generating the video and audio mix further comprises synchronizing the video from the video track and the audio signals from the first and second audio tracks by time-aligning time stamps associated with the video and audio signals, according to the synchronized internal clocks of the first and second portable electronic devices.

10. A first portable electronic device comprising
a camera that is configured to capture video;
a microphone that is configured to sense and convert sound into an audio signal;
a processor; and
memory having stored therein instructions that when executed by the processor
for a double system recording session, record (1) sound using the microphone and (2) video using the camera, wherein the audio signal from the microphone is associated with a first audio track;
in response to the first portable electronic device stopping the recording of its sound and video, receive, from a second portable electronic device, a second audio track with an audio signal that is associated with the double system recording session;
compare the audio signal from the first audio track with the audio signal from the second audio track; and
automatically generate a mix of (i) the video, (ii) the audio signal from the first audio track, and (iii) the audio signal from the second audio track, wherein the audio signal from one of the first and second audio tracks within the mix is adjusted based on the comparison, wherein the instructions that when executed by the processor automatically generates a mix include instructions that when executed by the processor
analyze a video segment of the video from the camera to identify an image object within the video segment; and
in response to the identified image object, apply, independent of locations of the image object within the video segment, ducking values to the audio signal from one of the first or second audio tracks within the generated mix, the image object being a source of the audio signals from both the first audio track and the second audio track.

11. The first portable electronic device of claim 10, wherein the instructions that when executed by the processor compare the audio signal from the first audio track with the audio signal from the second audio track comprises instructions that when executed by the processor analyze the audio signals from both the first and second audio tracks to identify an audio characteristic; and
wherein the instructions that when executed by the processor automatically generate a mix comprises instructions that when executed by the processor apply, based on the identified audio characteristic, one of (1) a spectral shape modification, (2) a dynamic range compression, or (3) a noise suppression operation to one of the audio signals from the first and second audio tracks.

12. The first portable electronic device of claim 10, wherein the memory has stored therein instructions that when executed by the processor, based on the comparison between audio signals from the first and second audio tracks, add a pre-recorded audio track into the mix at a lower volume than an overall volume of the mix.

13. The first portable electronic device of claim 12, wherein the pre-recorded audio track is a musical composition that is to be played in the background.

14. The first portable electronic device of claim 10, wherein the memory stores therein further instructions that when executed by the processor receive, from a third portable electronic device, a third audio track with an audio signal that is associated with the double system recording session,
wherein the processor compares the audio signals by analyzing a distinct audio event in the audio signal of each of the first, second, and third audio tracks to estimate distance information between (1) the first portable electronic device, (2) the second portable electronic device, and (3) the third portable electronic device, and wherein an audio signal from one of the first, second, or third audio tracks within the generated mix is ducked based on the estimated distance information.

15. A method for automatically producing a video and audio mix at a first portable electronic device, the method comprising:
recording, for a double system recording session, a first audio signal and a first video signal;
receiving, from a second portable electronic device, a second audio signal that was recorded by the second portable electronic device during the double system recording session and a second video signal with video that was recorded by the second portable electronic device during the double system recording session;
analyzing the first audio signal and the second audio signal to identify an audio characteristic that indicates which video from the first or second video signals is to be displayed over the other;
analyzing both the first and second video signals to identify an image object therein;
upon identifying the audio characteristic and the identified image object, applying a transition effect to the first video signal to segue from an end of a scene in the first video signal to a start of a scene in the second video signal and applying, independent of locations of the image object within the first and second video signals, ducking values to one of the first audio signal or the second audio signal, the image object being a source of both the first audio signal and the second audio signal; and
combining (1) the first video signal with the applied transition effect, (2) the second video signal, and (3) the first and second audio signals with the ducking values applied to either the first audio signal or the second audio signal into a mix.

16. The method of claim 15 further comprising
analyzing the second video signal to identify an image object therein that further suggests that the second video signal is predominate, wherein applying the transition effect is in response to identifying the audio characteristic and the image object.

17. The method of claim 16, wherein the image object in the second video signal comprises a facial expression of a person speaking and the audio characteristic is in the first audio signal and comprises a detection of speech.

18. The method of claim 15 further comprising
analyzing both the first and second video signals to identify an image object therein that suggest which audio from the first or second audio signals should be emphasized over the other, in the mix; and based on a comparison of (i) the identified image objects with (ii) the identified audio characteristic, determining (1) a transition effect to be applied to the first video signal and (2) ducking values to be applied to the first audio signal, wherein
the second video signal is displayed instead of the first video signal, while the transition effect is applied to the first video signal, and
the second audio signal is emphasized over the first audio signal, while the ducking values are applied to the first audio signal, during playback of the mix.

19. The method of claim 18, wherein the transition effect is a cut, a wipe, or a fade out effect.

* * * * *